US012256124B2

(12) United States Patent
Holden et al.

(10) Patent No.: US 12,256,124 B2
(45) Date of Patent: *Mar. 18, 2025

(54) ENVIRONMENT OBJECT RECOGNITION

(71) Applicant: Comcast Cable Communications, LLC, Philadelphia, PA (US)

(72) Inventors: Dan E Holden, Denver, CO (US); Michael J. Cook, Flemington, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,308

(22) Filed: Jan. 5, 2024

(65) Prior Publication Data

US 2024/0205499 A1    Jun. 20, 2024

Related U.S. Application Data

(63) Continuation of application No. 17/077,589, filed on Oct. 22, 2020, now Pat. No. 11,910,057, which is a continuation of application No. 16/519,631, filed on Jul. 23, 2019, now Pat. No. 10,856,044, which is a continuation of application No. 15/890,764, filed on Feb. 7, 2018, now Pat. No. 10,412,449, which is a continuation of application No. 13/775,956, filed on Feb. 25, 2013, now abandoned.

(51) Int. Cl.
*H04N 21/442* (2011.01)
*H04N 21/4223* (2011.01)
*H04N 21/458* (2011.01)
*H04N 21/81* (2011.01)

(52) U.S. Cl.
CPC ... *H04N 21/44218* (2013.01); *H04N 21/4223* (2013.01); *H04N 21/458* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 5,771,307 A | 6/1998 | Lu et al. | |
| 7,134,130 B1 | 11/2006 | Thomas | |
| 8,620,088 B2 | 12/2013 | Lee | |
| 8,965,170 B1* | 2/2015 | Benea | H04H 60/33 386/224 |
| 10,412,449 B2 | 9/2019 | Holden et al. | |
| 11,910,057 B2* | 2/2024 | Holden | H04N 21/44218 |
| 2008/0068622 A1 | 3/2008 | Deng et al. | |
| 2008/0103978 A1 | 5/2008 | Houston | |
| 2008/0284905 A1 | 11/2008 | Chuang | |
| 2008/0298571 A1 | 12/2008 | Kurtz et al. | |
| 2009/0025024 A1 | 1/2009 | Beser et al. | |
| 2010/0076828 A1 | 3/2010 | Neufeld et al. | |
| 2011/0263946 A1 | 10/2011 | El Kaliouby et al. | |

(Continued)

*Primary Examiner* — Junior O Mendoza
(74) *Attorney, Agent, or Firm* — Banner & Witcoff, Ltd.

(57) ABSTRACT

Methods, systems, and devices for displaying additional or targeted content to a user are disclosed. An image or data capture device associated with a display device may capture an image of an environment associated with the user or capture data related to what is being viewed by the viewer's eyes. Objects in the captured image may be recognized, and additional content may be provided based on presence or absence of recognized objects.

21 Claims, 18 Drawing Sheets

(56) References Cited

U.S. PATENT DOCUMENTS

| | | |
|---|---|---|
| 2012/0072419 A1 | 3/2012 | Moganti et al. |
| 2012/0072936 A1* | 3/2012 | Small .................... G06Q 30/00 725/10 |
| 2012/0222058 A1 | 8/2012 | El Kaliouby et al. |
| 2012/0304206 A1 | 11/2012 | Roberts et al. |
| 2013/0005443 A1 | 1/2013 | Kosta et al. |
| 2013/0205311 A1 | 8/2013 | Ramaswamy et al. |
| 2013/0205314 A1 | 8/2013 | Ramaswamy et al. |
| 2013/0339433 A1 | 12/2013 | Li et al. |
| 2014/0259034 A1 | 9/2014 | Terrazas |
| 2014/0375558 A1 | 12/2014 | Conness et al. |

\* cited by examiner

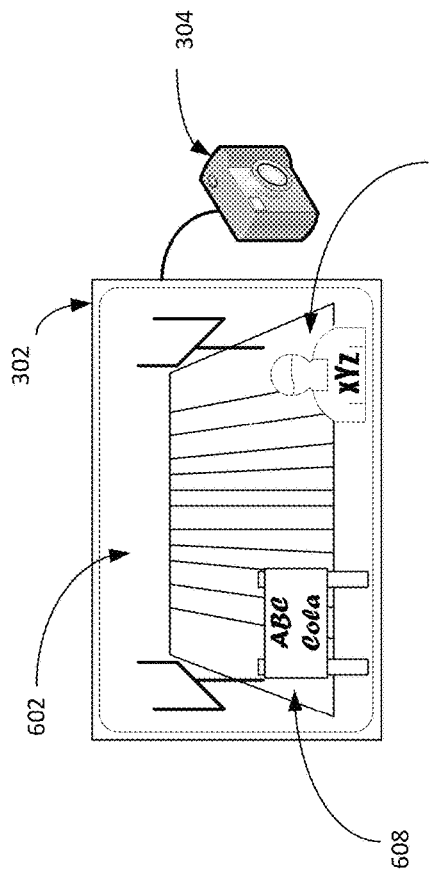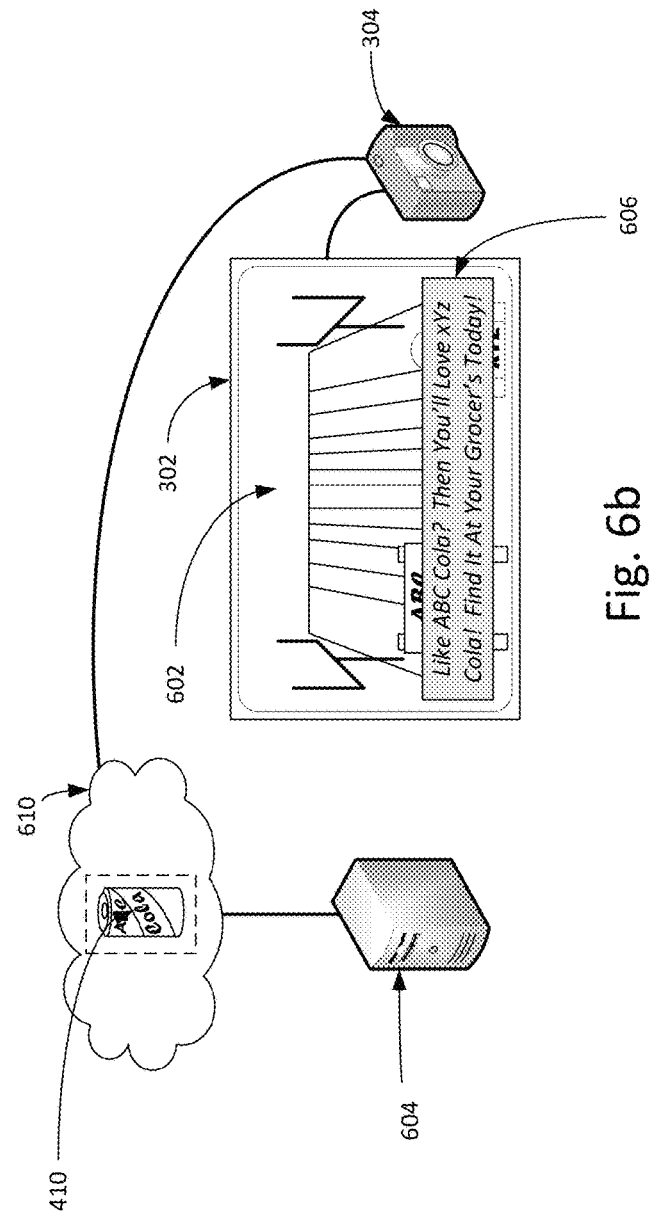
Fig. 6a
Fig. 6b

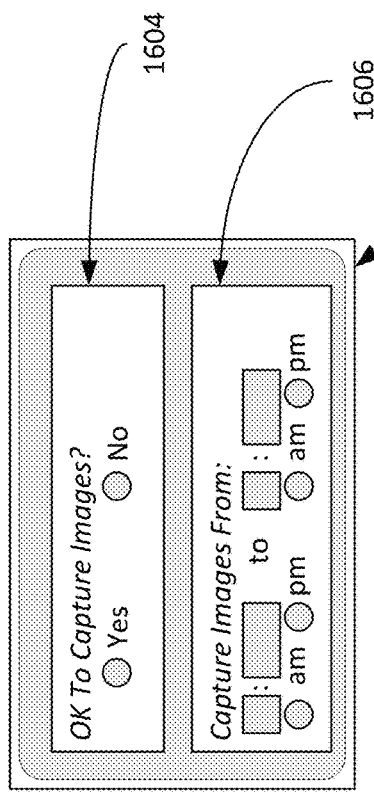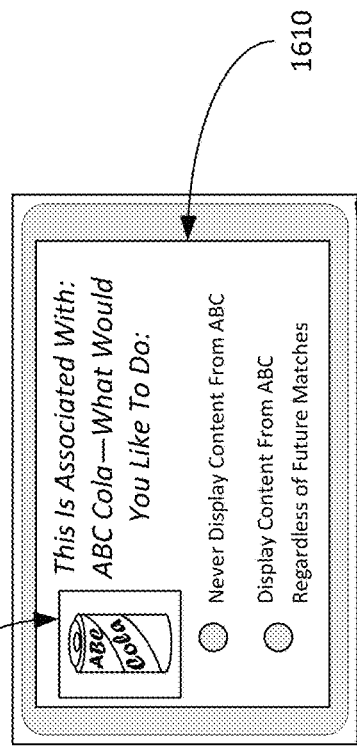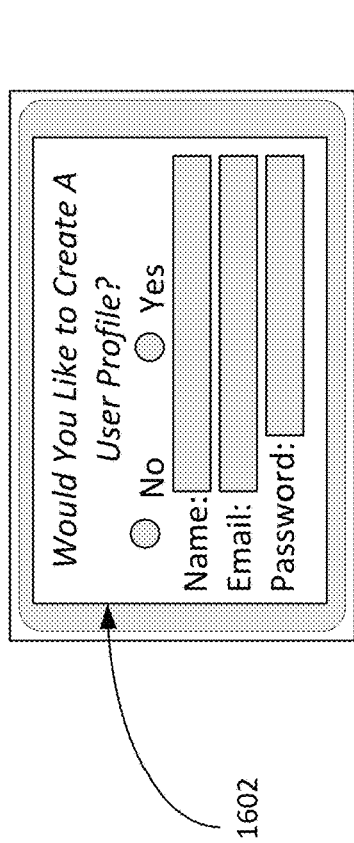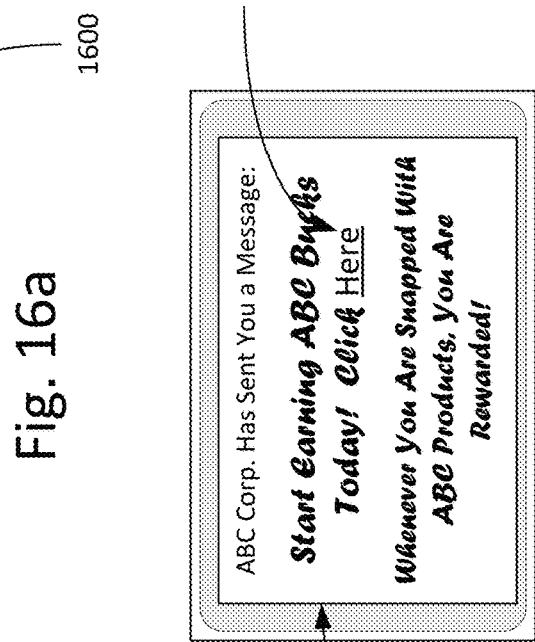
Fig. 16a
Fig. 16b
Fig. 16c
Fig. 16d

ENVIRONMENT OBJECT RECOGNITION

CROSS-REFERENCE TO RELATED APPLICATIONS

This application is a continuation of and claims priority to U.S. patent application Ser. No. 17/077,589, filed on Oct. 22, 2020, which is a continuation of U.S. patent application Ser. No. 16/519,631, filed on Jul. 23, 2019 (now U.S. Pat. No. 10,856,044), which is a continuation of U.S. patent application Ser. No. 15/890,764, filed on Feb. 7, 2018 (now U.S. Pat. No. 10,412,449), which is a continuation of and claims priority to U.S. patent application Ser. No. 13/775,956, filed on Feb. 25, 2013 (now abandoned) and entitled "ENVIRONMENTAL OBJECT RECOGNITION." Each of the aforementioned applications is hereby incorporated by reference herein in its entirety.

BACKGROUND

Content provided to consumers often comes in a one-size-fits-all variety. That is, content is regularly transmitted to the consuming public as a whole, not tailored to the end consumer. Many consumers who ultimately receive the content may not relate to or enjoy what is being offered. Content providers, advertisers, and the like, have conducted research to determine, e.g., an average demographic group that may be viewing content at a particular time or location and then tailored content based on the average viewing public. Such an approach, however, alienates a significant portion of consumers who are accessing content but who do not fall into the average demographic. There remains a need to gather information about a consumer, and tailor content provided to that consumer accordingly. This disclosure relates to providing content to a user in a way that overcomes the above shortfalls.

SUMMARY

The following summary is for illustrative purposes only, and is not intended to limit or constrain the detailed description.

The disclosure is directed to methods, systems, and devices aimed at satisfying the need of delivering targeted content to end users. Some aspects of this disclosure relate to capturing images of objects associated with a user accessing content, and providing the user additional content based on the captured images. Further aspects of this disclosure relate to tracking a user's interaction with content, such as by, e.g., determining which portion of delivered content a user is viewing, and providing additional content based on the user's interaction.

In an exemplary embodiment of the present disclosure, this is achieved by associating an image capture device (e.g., a camera) with a display device. The image capture device captures an image of a user accessing content and her surroundings, and at least one object in the captured image is recognized. In another aspect, what is being viewed by the user's eyes may be determined, and an object on the display screen which the user is viewing is recognized. The recognized object may be compared to a list of known or dynamically determined target objects, and, if it is determined the object matches a target object, additional content may be selected based on the match. The additional content may then be presented or offered to the user. In this way, targeted content is provided to the user according to objects she is near or interacting with while accessing content, further tailoring the content to the user's individual tastes.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIG. 6a illustrates one embodiment of content displayed on a display device.

FIG. 6b illustrates one embodiment of additional content associated with a recognized object from FIG. 5.

FIG. 16a illustrates one embodiment of an example user interface associated with one embodiment of the disclosure.

FIG. 16b illustrates another embodiment of an example user interface associated with one embodiment of the disclosure.

FIG. 16c illustrates yet another embodiment of an example user interface associated with one embodiment of the disclosure.

FIG. 16d illustrates yet another embodiment of an example user interface associated with one embodiment of the disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
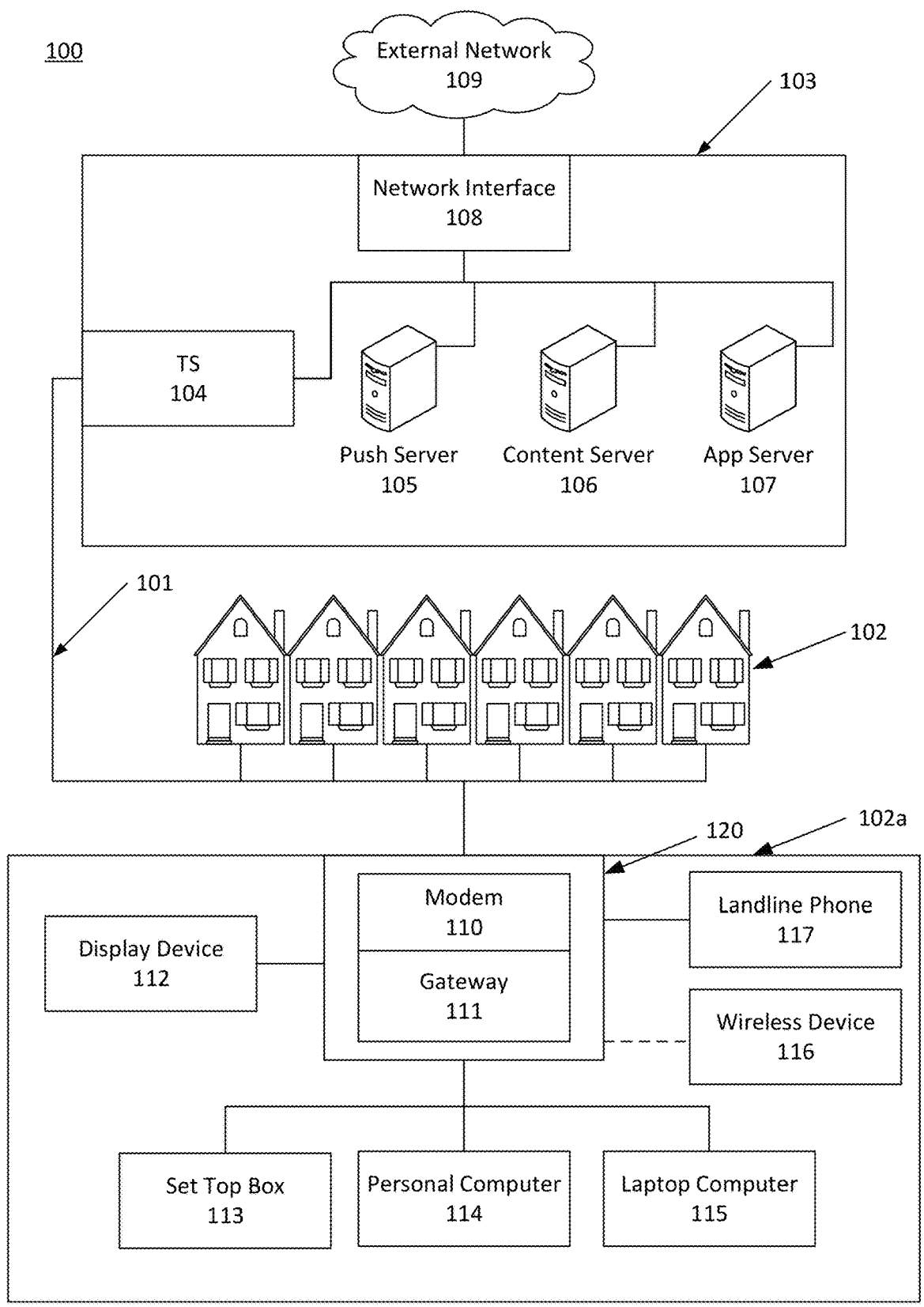
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 113 (e.g., televisions), additional STBs 112, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
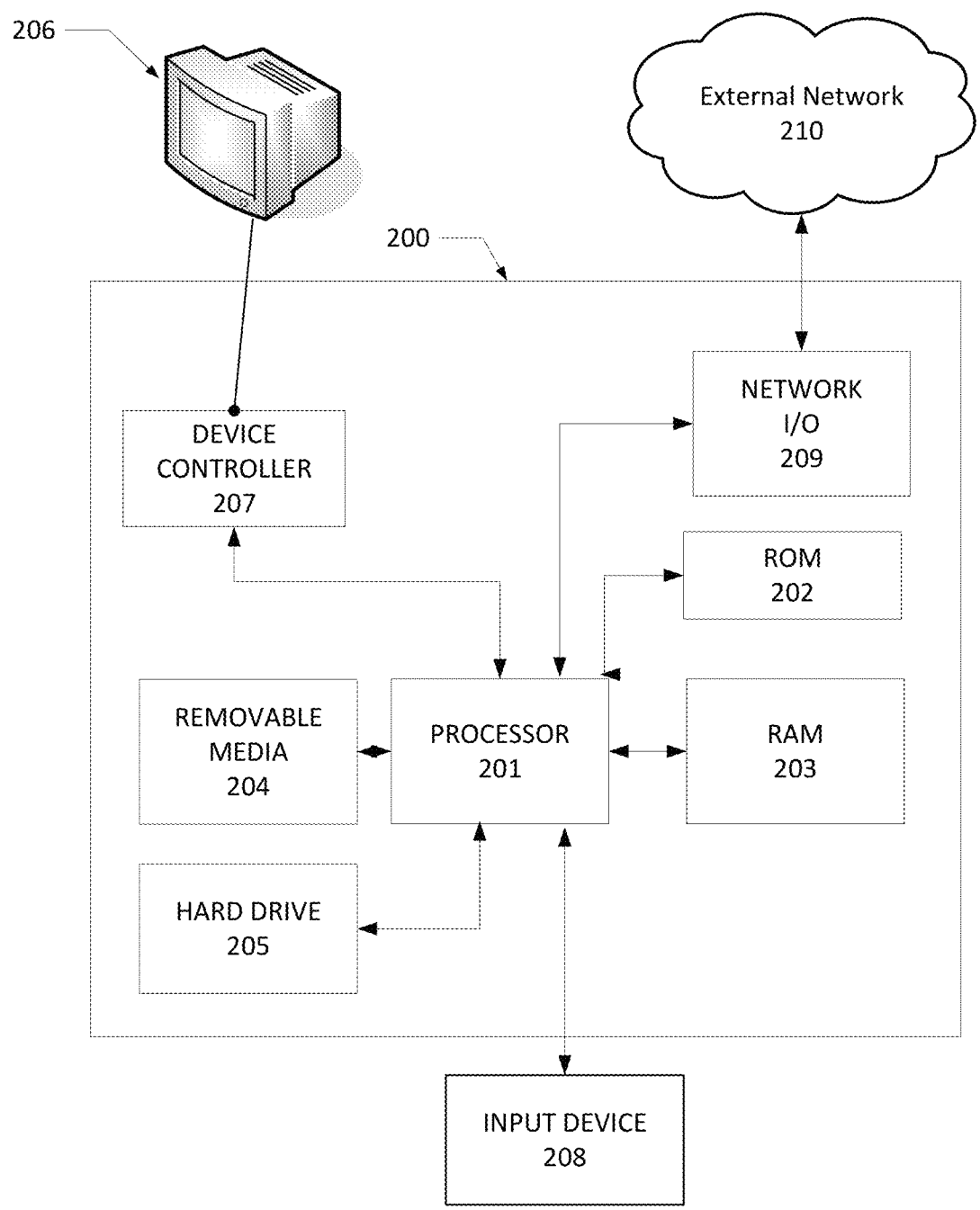
FIG. 2 illustrates an example computing device and software configuration that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

FIG. 2 is an example computing device having a hardware and/or software configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
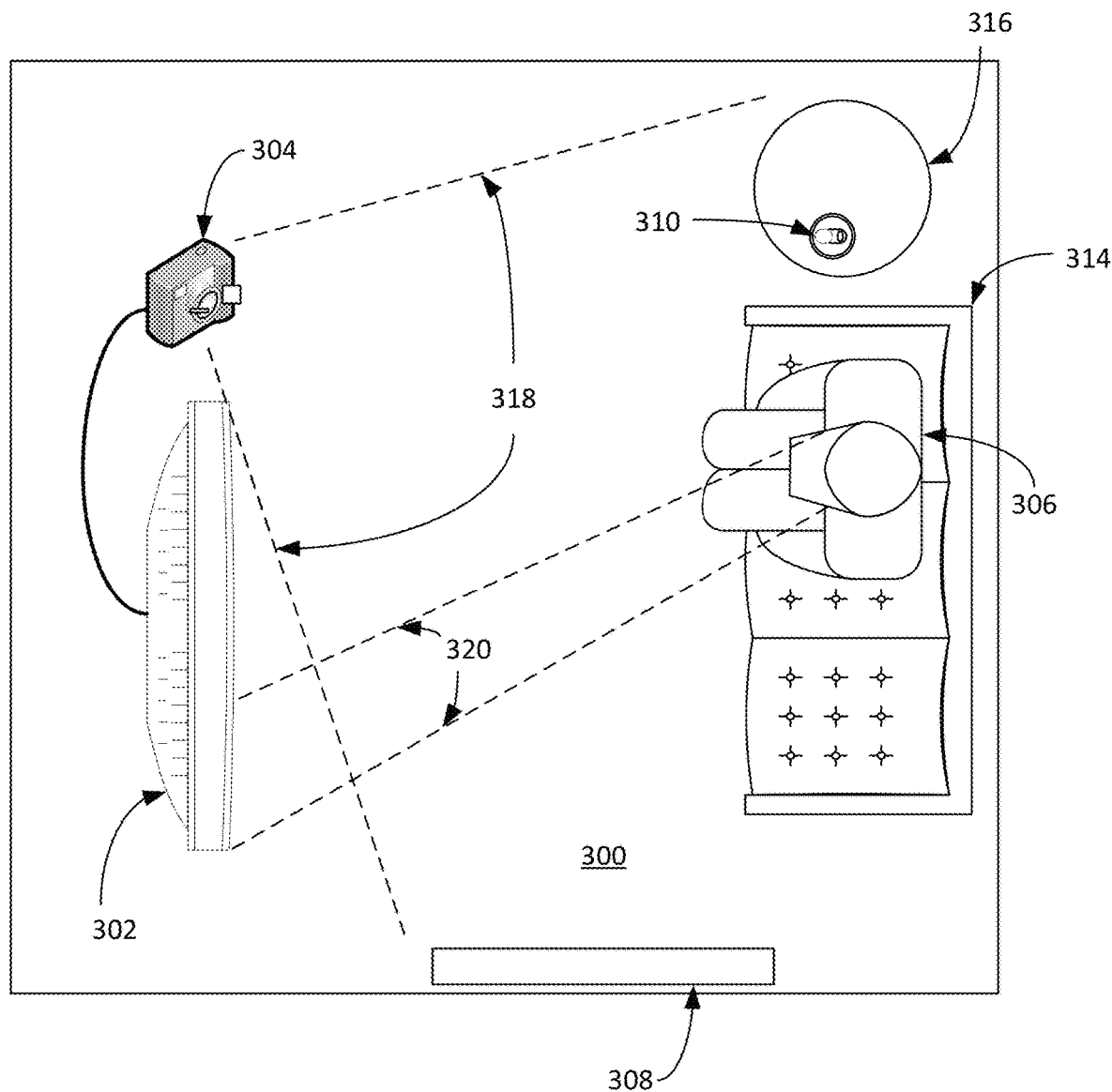
FIG. 3 illustrates a user's room as an example environment in which some embodiments of the present disclosure may be used.

FIG. 3 illustrates an example environment in which one embodiment of the disclosure may be employed. This example environment comprises room 300 which may be, e.g., a room in user's 306 home. In other embodiments, room 300 may be any space where user 306 may access or consume content. For example, room 300 may be, e.g., user's 306 place of employment, a train, an airplane, user's 306 school, user's 306 church, etc. Room 300 includes a user 306 accessing content via display device 302. For example, the user 306 may be watching a television program on display device 302. Display device 302 may be any device in the art suitable for displaying content as discussed above in reference to FIG. 1 including, but not limited to, a television, a video display, a computer monitor, a desktop computer, a laptop computer, a tablet computer, a smartphone, and the like. In FIG. 3, display device 302 is located across from user 306 sitting on sofa 314. Room 300 also includes further exemplary items that may be found in and around user 306 accessing content, including a table 316, a food or beverage related item such as a cola can 310, and an image such as a picture frame 308. Again, each item is merely representative of objects which may be located around user 306 accessing content and is not intended to limit or define a typical environment for use of the present disclosure. The range and number of objects which may be around user 306 in other settings is virtually limitless.

An image sensing or capturing device, such as a camera 304 may be associated with the display device 302. In FIG. 3, camera 304 is depicted as sitting to the side of display device 302, but camera 304 may be located at any suitable location throughout room 300. Further, in some embodiments, camera 304 may be integral to display device 302. For example, televisions, personal computers, laptop computers, tablet computers, smartphones, and others may contain cameras integrally formed within the display device. The exact location, configuration, and association of camera 304 with display device 302 can vary significantly without departing from the present disclosure.

Broken lines 318 represent of an exemplary field of view of camera 304. In the illustrated example, camera 304 is positioned such that table 316, cola can 310, sofa 314, user 306, and frame 308 are all in its field of view. In various other embodiments, camera 304 may be positioned in such a way that less than all of the items in room 300 are its field of view. For example, in one embodiment camera 304 may be focused on sofa 314, and accordingly only users and/or items situated on or around sofa 314 would be in camera's 304 field of view. In another embodiment, camera 304 may be focused on table 316, and accordingly only users and/or items situated near table 316 would be in camera's 304 field of view. In still another embodiment, camera 304 may be located behind user 306 and focused towards display device 302, and accordingly only users and/or items situated between camera 304 and display device 302 would be in camera's 304 field of view. The image capture device (e.g., camera) 304 may also be dynamically controllable, for example, to continuously scan the room 300. The location and configuration of camera 304 may be further varied without departing from the scope of this disclosure.

Broken lines 320 represent an exemplary field of view of user 306. While accessing content, user 306 may alter her field of view depending on, e.g., an object of interest appearing on the display device 302. As depicted by broken lines 320, in this example user 306 is focusing her gaze towards the left side of display device 302. As will be appreciated with discussion of the following figures, user's 306 field of view is also focused on the lower part of the screen. That is, in this example, user 306 is focusing her gaze on the lower, left side of display device 302.

Figure 4:
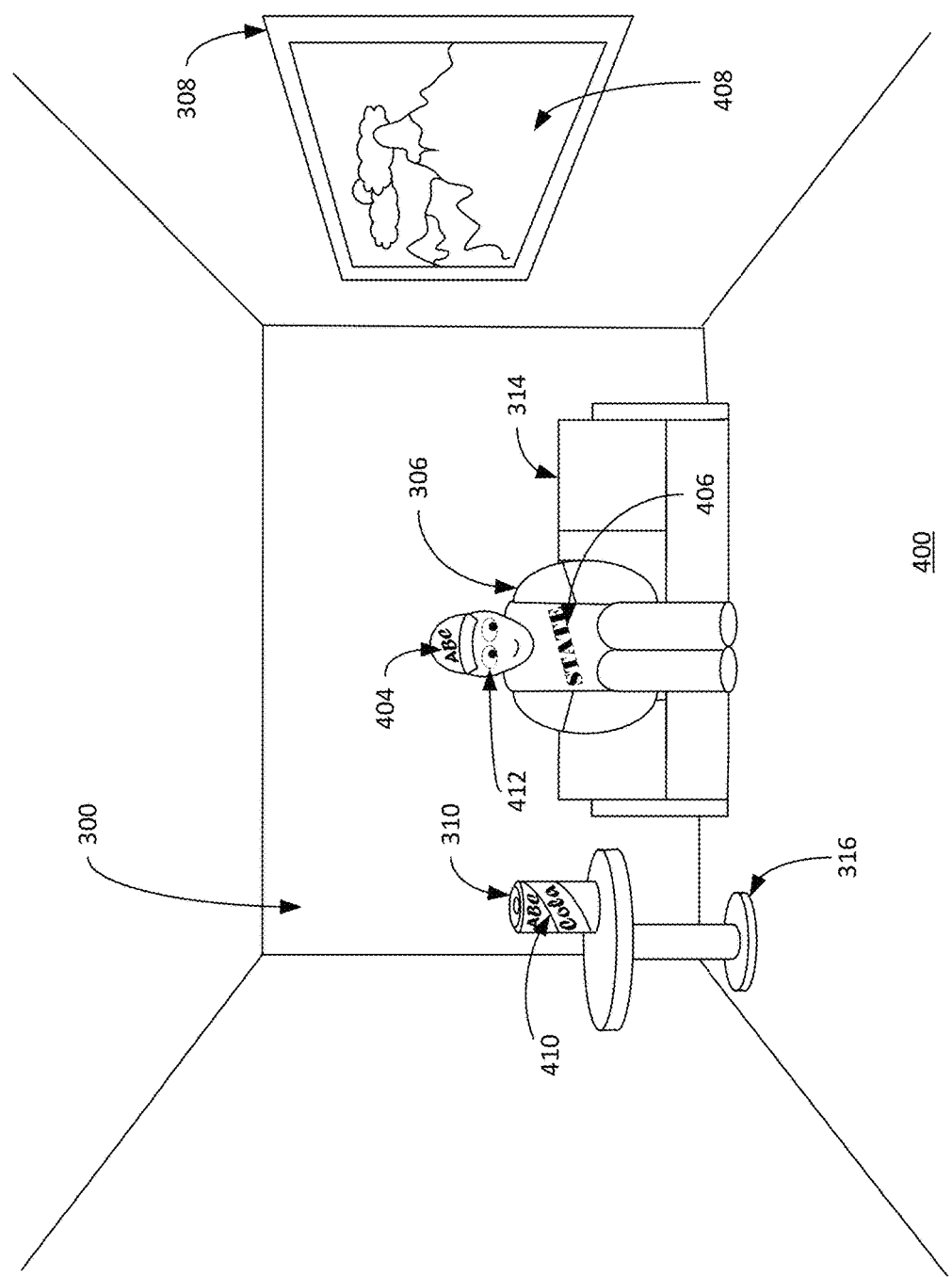
FIG. 4 illustrates an example captured image of the room depicted in FIG. 3.

FIG. 4 illustrates an exemplary captured image 400 by camera 304 according to one embodiment of the disclosure. Specifically, captured image 400 is representative of an image camera 304 may capture having a field of view illustrated by broken lines 318. In this embodiment, captured image 400 is a perspective view of room 300 and each of its components which appear within broken lines 318. Specifically, the captured image 400 includes a perspective view of user 306, table 316, cola can 310, sofa 314, and frame 308. In some embodiments, captured image 400 may include one or more objects. As used herein, "object" refers broadly to any identifiable image, item, detail, article, and the like. For example, in this embodiment, captured image contains brand name object 410 (i.e., the brand name on cola can 310), logo object 404 (i.e., the logo on user's 306 hat), graphic object 406 (i.e., the graphic on user's 306 shirt), and photograph object 408 (i.e., the photograph contained in frame 308). An image capture device (e.g., camera 304) or other data capture device may also recognize user's eyes 412, and more specifically, what is being viewed by user's eyes 412 as will be discussed more fully. Again, each object presented in FIG. 4 is for illustrative purposes only. In other embodiments, user 306 accessing content on a display device 302 may have any number of objects on or around her that may appear in a captured image 400. Objects may be recognized by comparing the detected image with predefined images of known objects, logos, brands, words, etc. using any desired image-matching technique. Additionally, objects may be recognized as fitting the basic shape of a known type of object (e.g., a shape of a soda can is recognized, even if the logo on the can is not).

As discussed above, user's eyes 412 are generally fixed down and towards the left side of display device 302. That is, as seen in the perspective view of user 306, user's eyes 412 appear to be gazing down and towards the right side of captured image 400 (corresponding to the left side of display device 302). As will become evident with respect to the discussion of other figures below, user's eyes 412 are thus an indication that user 306 is viewing an item appearing on the lower, left side of display device 302.

Figure 5:
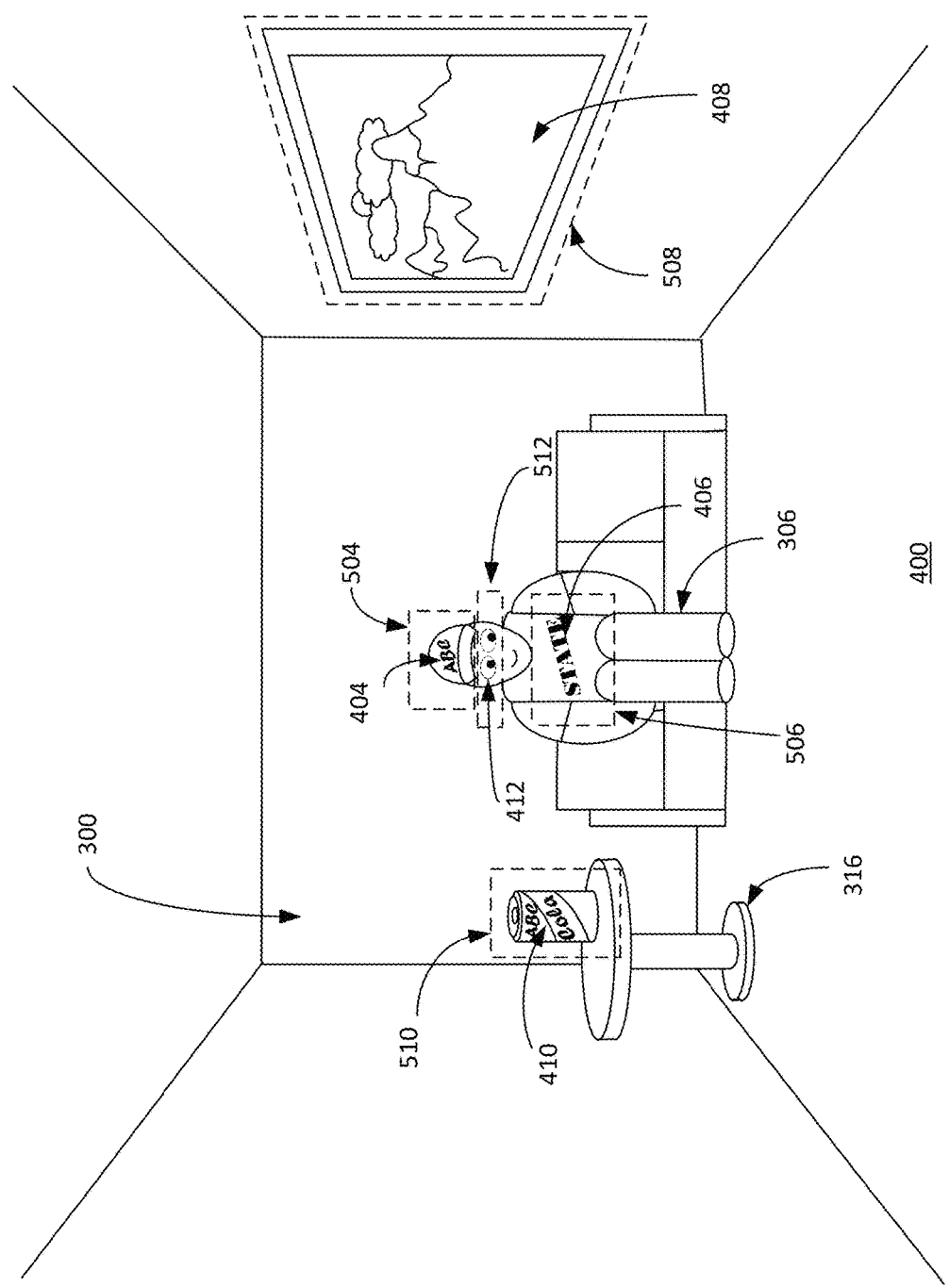
FIG. 5 illustrates recognition of example objects in the captured image of FIG. 4.

Moving to FIG. 5, object recognition according to one aspect of the disclosure is depicted. Broken lines 504, 506, 508, 510, and 512 are representations of one embodiment of the present disclosure recognizing objects/eyes in captured image 400. Specifically, broken lines 504 represent recognition of logo object 404, broken lines 506 represent recognition of graphic object 406, broken lines 508 represent recognition of photograph object 408, broken lines 510 represent recognition of brand name object 410, and broken lines 512 represent recognition of user's eyes 412. Any desired image-matching and recognition technique may be used to recognize the objects. In one embodiment, such techniques may be used to, e.g., recognize an object associated with an item in captured image 400 (e.g., recognize brand name object 410). In other embodiments, these techniques may be used to, e.g., recognize features of the user 306 herself (e.g., facial recognition and/or recognize user's eyes 412).

Merely by way of example, recognition may be performed by a processor operatively coupled to memory containing application software well known in the art as suitable for object recognition. A processor and/or memory for performing such a task may be integral to the display device 302 and/or camera 304 or may be remote from each component (at, e.g., a centralized server). This application software may perform various recognition tasks to, e.g., captured image 400 in order to recognize objects therein. For example, the application software may comprise a database of exemplar objects and a processor may thus compare, e.g., captured image 400 to the database of exemplar objects. If the captured image 400, or any aspect of the captured image 400 (e.g., a specific text string, logo, unique design, color pattern, etc.) is similar to an exemplar image, the processor running the application software may recognize the captured image 400 and/or specific aspect of the captured image 400 as being the same as the exemplar object. This method of object recognition is merely illustrative of one method of recognizing objects in a captured image, and is not intended to define or limit the object recognition process of the present disclosure. Those skilled in the art will appreciate various other methods and hardware/software combinations that are suitable for recognizing objects within a captured image. Any number of these suitable methods for object recognition may be employed herein without departing from the present disclosure.

Figure 6C:
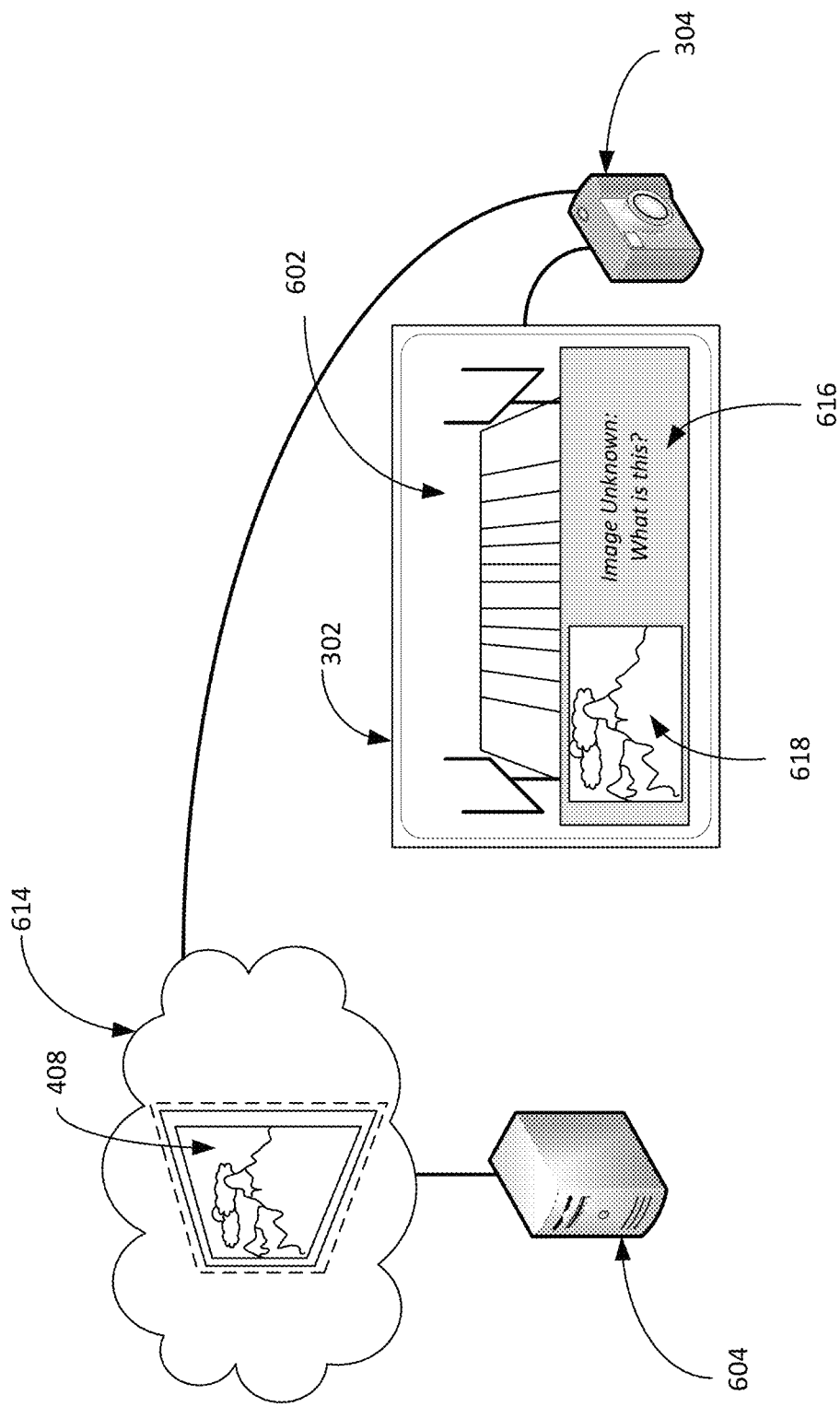
FIG. 6c illustrates another embodiment of additional content associated with a recognized object from FIG. 5.

FIGS. 6a-6c illustrate embodiments of displaying additional content to a user once objects have been recognized in the captured image 400. Specifically, FIG. 6a illustrates example content 602 that may be displayed on display device 302 associated with camera 304. By way of example, in FIG. 6a content 602 is a video presentation of a football game. The video images in content 602 may further include objects appearing in the video image. The objects appearing in the video image may include, e.g., discrete products, logos, signs, actors, etc., which user's eyes 412 may focus on when viewing content 602. Again, by way of example, in FIG. 6a, content 602 comprises objects including advertising sign 608, depicting "ABC Cola," and spectator 612, wearing a shirt depicting "xYz Cola." These objects are merely exemplary of types of objects that may be associated with a broadcast of a football game. In other embodiments, objects in content 602 may include, e.g., a product placed in a television show (such as a cola can sitting on a table or an automobile driving down the street), text associated with the content (such as a phone number or webpage address), or any other recognizable image or part of the video image. Returning to FIG. 6a, in this embodiment display device 302 may be, e.g., a television set, desktop computer, laptop computer, tablet computer, or smartphone and the like, displaying a live football game via fiber, coaxial cable, wireless, or other transmission media. Further, camera 304 may be integral to display device 302, or may be located externally to display device 302 and operatively coupled to display device by any method well known in the art.

FIG. 6b illustrates a first embodiment of displaying additional content on display device 302 according to one aspect of the disclosure. In FIG. 6b, display device 302 is displaying content 602 (in this example, a football game). Display device 302 is further displaying additional content 606. Specifically, the recognized brand name object 410 (which, as noted above with respect to FIG. 4, was identified in the room with the user) is processed by processor 604, as illustrated by processing cloud 610. The processing clouds used throughout the disclosure are for illustrative purposes only and are not intended to limit or define the manner in which objects are processed.

Processor 604 may be a processor integral to camera 304 and/or display device 302. Alternatively, processor 604 may be a processor located in another of a user's devices which are operatively coupled to or otherwise communicatively linked to camera 304 and display device 302. For example, processor 604 may be located in a desktop computer, laptop computer, tablet computer, smartphone, and the like operatively coupled to camera 304. Alternatively, processor 604 may be located remotely from display device 302 and camera 304. For example, processor 604 may be located at a centralized server. Referring back to FIG. 1, in one embodiment processor 604 may be located at a server in local office 103. In this embodiment, the display device 302 and camera 304 may be communicatively linked to local office 103 through, e.g., links 101. Processor 604 may be located at push notification server 105, content server 106, and/or application server 107. Processor 604 may take a variety of forms in a variety of locations without departing from the disclosure.

Returning to FIG. 6b, recognized brand name object 410 is processed by processor 604. In one embodiment, processing by processor 604 includes determining whether the recognized object 410 is associated with any additional content that can be provided to the user. For example, in the image processing that resulted in identifying the object 410 as being an "ABC" brand soda can, the processing may include determining whether the "ABC" brand soda has been associated with additional content relating to the brand. The additional content may be, for example, a pop-up advertisement for the product, a coupon or discount offer, or any other desired additional content. The determination may be made by consulting a target list or database that identifies relationships between visual images, content sources, and additional associated content. The list may be stored locally (e.g., on memory operatively coupled to processor 604) or remotely (e.g., at local office 103 and communicatively coupled to processor 604 by link 101).

For example, in FIG. 6b, brand name object 410 contains the brand name "ABC Cola." In this embodiment, processor 604 may compare "ABC Cola" to the target list, and identify an entry associating the content source for "ABC Cola". If the target list contains an entry for "ABC Cola," there may be additional content associated with the target object. For example, the makers of "ABC Cola" may identify additional images to be shown to the user, providing additional information or offers regarding their brand of soda. The additional information may include a resource address or link to additional content. In some embodiments, even a competitor of ABC Cola (e.g., "xYz Cola") may associate content with the object "ABC Cola." This content may be, e.g., an advertisement or other content associated with xYz Cola to be sent to a known user of ABC Cola in an attempt to have that user try their product. In this embodiment, because the xYz Cola content is associated with ABC Cola, when the processor 604 processes brand name object 410, determining a target match, processor 604 can send the additional content 606 to display device 302.

Display device 302 may display the additional content 606. In this example, additional content 606 is an advertisement for a competing company (i.e., xYz Cola) to the company associated with brand name object 410 which appeared in captured image 400. Thus, in this example, when camera 304 captures an image of brand name object 410 in the room with the user viewing the football game, an advertisement for a competing company can be returned and overlaid on the display device. In this way, advertisers may target certain users for advertisements rather than sending out a "one-size-fits-all" advertisement. Specifically, advertisers may target those who patronize a similar, yet competing, product (i.e., ABC Cola) in an attempt to have them try their product (i.e., xYz Cola).

Additional content 606 may take a variety of forms well known in the art without departing from the present disclosure. For example, in FIG. 6b, additional content 606 appears as a banner overlaid on content 602. Alternatively, as is well known in the art, additional content may be a popup window rather than a banner advertisement. In this embodiment, additional content 606 may be a window providing a message or advertisement that overlays content 602 until, e.g., a user closes the popup window. Additionally, additional content 606 may take the form of, e.g., a full-page advertisement. In this embodiment, additional content may overlay, and thus cover up, all of content 602. Alternatively, additional content may be, e.g., a television commercial, and thus delivered to user 306 at a scheduled commercial break. Alternatively, as will be appreciated by those skilled in the art, display device 302 may have multiple feeds. One feed may carry, e.g., content 602, while another feed may go to, e.g., a quadrature amplitude modulation (QAM) delivery for video-on-demand (VOD) streams. In such an embodiment, additional content 606 may comprise a channel change to the VOD stream carrying, e.g., an advertisement. In some embodiments, the additional content 606 may be an Internet address that the viewer can access from the display device 302 or via a different device. Additional content 606 may take any number of forms well known in the art without departing from the instant disclosure.

Those skilled in the art will also recognize that additional content 606 need not be associated with a competing company to that of a matched object. As presented in the various exemplary embodiments below, the content may be complimentary (i.e., associated with the same or related entity) or neutral (i.e., associated with an entity that is merely interested in reaching out to, e.g., soda drinkers). For example, ABC Cola, rather than xYz Cola, may associate additional content 606 with objects, such as brand name object 410, which depict their own brand name. That is, when the processor 604 processes brand name object 410, it may match the object on the target list to content provided by ABC Cola (rather than xYz Cola). Processor 604 may then return additional content 606 to display device 302 which is complementary to the brand name object 410. In this embodiment, additional content 606 may depict, e.g., a loyalty program associated with ABC Cola. That is, entities may use an embodiment of the present disclosure to, e.g., track user's 306 use of their products. The user 306 may then be rewarded when images are captured of him or her using a certain product, or, as explained in detail below, when user 306 views an object on display device 302 related to a certain product. Specifically, returning to FIG. 6b, user 306, who appears with brand name object 410 in captured image 400, could be rewarded for having Cola Can 310 around while accessing content. For example, user 306 could receive, e.g., loyalty points (deposited in a user account as will be discussed below) when captured image 400 contains objects associated with ABC Cola or when user 306 views an object associated with ABC Cola. In such an embodiment, instead of a competing advertisement, additional content 606 may contain a notification that these loyalty points have been deposited in user's 306 account. In this way, user 306 would be encouraged to continue to patronize a certain brand because he or she will be rewarded when images are captured including the brand name object 410. This example illustrates how one embodiment of the present disclosure provides advantages to advertisers, as compared to traditional content distribution techniques, because advertisers can target current customers and strengthen their consumer base, while refraining from providing content to, e.g., users of another product or users who may not drink soda.

As noted above, an object may be recognized specifically, e.g., a can of ABC brand soda. Alternatively, an object may be recognized as a general object, but the actual source may be unrecognized by the image processor. For example, the camera 304 may be configured to recognize cans in general, without recognizing an associated brand or label on the can. FIG. 6c represents one embodiment wherein a recognized object does not match a target object on the target list. That is, even though an object may be recognized as a general object using any of the aforementioned object recognition techniques (e.g., the general shape of a can), there may not be a match with any corresponding content source stored on the target list. In such a case, an embodiment of the present disclosure may obtain further information about the recognized object and, if ultimately identified, store the recognized object in the target list for future matches. Specifically, in the embodiment depicted in FIG. 6c, the captured object may be displayed to the user with a request that the user enter information about a recognized object. Here, processor 604 processes photograph object 408, as represented by processing cloud 614, but processor 604 does not match photograph object 408 to a brand-specific target object on the target list. In this example, additional content 616 is returned to display device 302, which prompts user 306 for more information regarding photograph object 408. Specifically, a representation 618 of photograph object 408 is presented via additional content 616 on display screen 302. In this embodiment, user 306 is prompted to enter more information regarding photograph object 408. For example, user 306 may be prompted to enter the name or brief description of photograph object 408. In the depicted example, user 306 may input information such as "mountains" or "Denver, Colorado."

Further, one embodiment may then use this information to store photograph object 408 on the target list for future matches. Specifically, processor 604 may transmit the information and/or a representation 618 of photograph object 408 to a remote computing device (not pictured) which identifies the object. Remote computing device may comprise an object database containing an object that matches photograph object 408. Alternatively, processor 604 and/or a remote computing device may perform, e.g., an internet search using the inputted information and/or representation 618 of photograph object 408 to identify the object. If successfully identified, one embodiment of the disclosure may then store the image, e.g., representation 618, on the target list. Such an embodiment may result in an ever-evolving and growing list of target objects. Interested entities may periodically review such a list, and associate additional content with newly identified target objects so that for future matches processor 604 will return additional content when, e.g., photograph object 408 is recognized.

Figure 7:
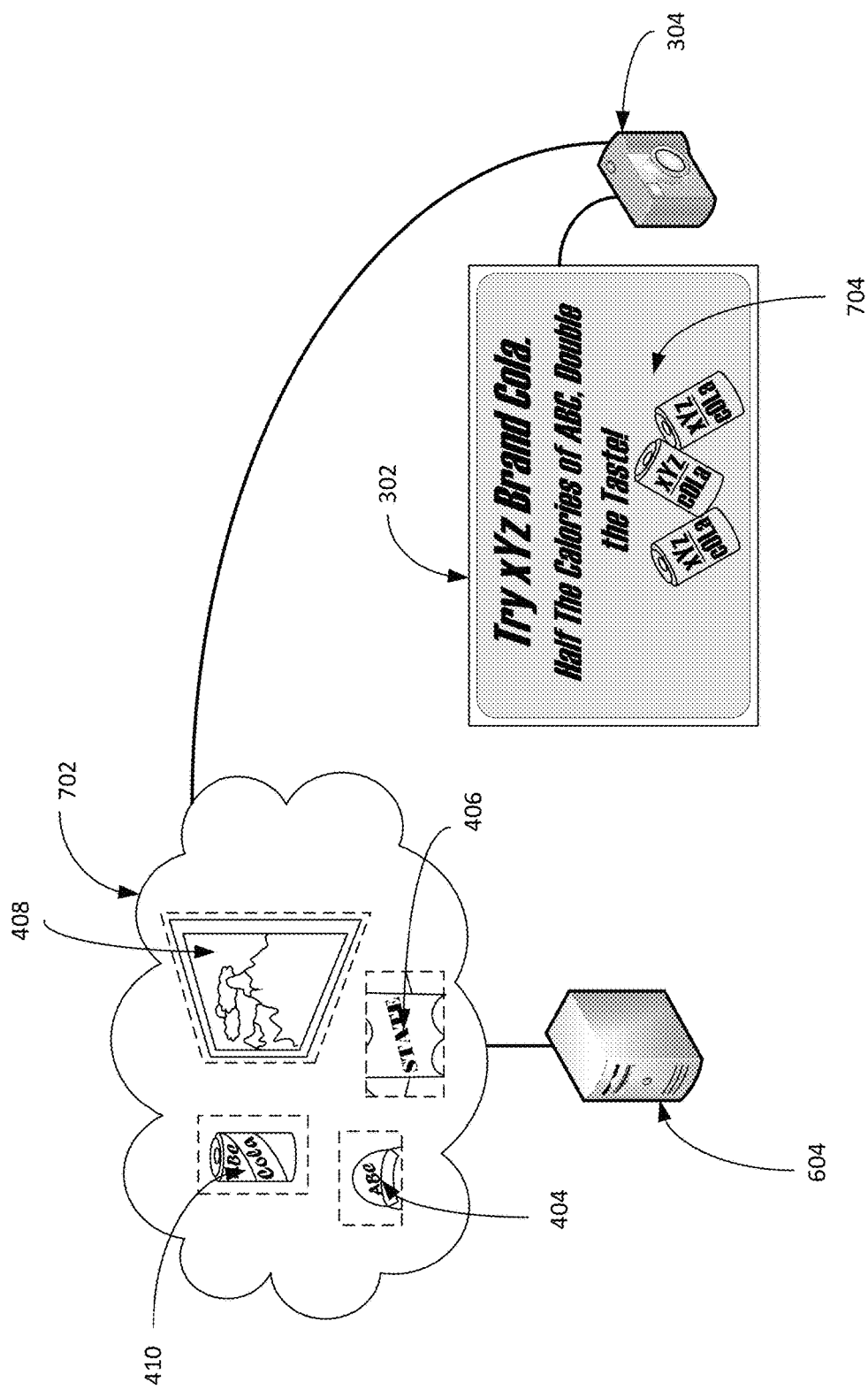
FIG. 7 illustrates one embodiment of additional content associated with more than one recognized objects from FIG. 5.

FIG. 7 presents an embodiment of the disclosure wherein more than one recognized object from captured image 400 is used to provide additional content. Specifically, in FIG. 7, logo object 404, graphic object 406, photograph object 408, and brand name object 410 are all identified in the room of the viewer and processed by processor 604, as illustrated by processing cloud 702. In this embodiment, each object may be associated with a target object on the target list. That is, when each object is processed by processor 604, processor 604 may return multiple matches, and each of the multiple matches may be associated with different additional content. Alternatively, less than all of objects may be associated a target object on the target list.

In the embodiment depicted, processor 604 may select additional content to display on display device 302 based on the number of instances a matched object appears in the captured image 400. For example, in this embodiment, processor 604 processes, as represented by processing cloud 702, brand name object 410, logo object 404, graphic object 406, and photograph object 408. Two of those objects, namely brand name object 410 and logo object 404, are associated with ABC Cola. The other objects are unrelated to each other. In this embodiment, when more than one object matches a target object (or content source) in the target list, the additional content 704 selected for display may be the one that corresponds with the source or target object having the most matches. That is, additional content 704 is associated with brand name object 410 and logo object 404, which both match an "ABC Cola" target object. Because brand name object 410 and logo object 404 both match the same target object, and no other target objects had more matching objects in the captured image, processor 604 will return additional content 704, associated with the target object matching brand name object 410 and logo object 404. In this embodiment, additional content 704 is a full page advertisement depicting a competing company to the matched target object; namely "xYz Cola." As discussed above, additional content 704 may take a variety of forms (e.g., banner, popup, full-page, etc.) and be associated with a variety of entities (e.g., competing, complimentary, neutral) without departing from the scope of this disclosure.

In an alternative embodiment, processor 604 may return additional content 704 associated with a recognized object appearing the least amount of instances in the captured image. For example, in an alternative embodiment there may be two recognized objects associated with ABC Cola (e.g., brand name object 410 and logo object 404) and two recognized objects associated with Denver, Colorado (e.g., photograph object 408 and an additional object not pictured). In this embodiment, processor 604 may return additional content 704 associated with, e.g., graphic object 406. That is, in this embodiment objects associated with State University (e.g., graphic object 406) appear only once while objects associated with other target objects (namely, ABC Cola and Denver, Colorado) appear more than once, and thus processor 604 returns additional content 704 associated with the object appearing the least amount of instances in captured image 400.

Figure 8:
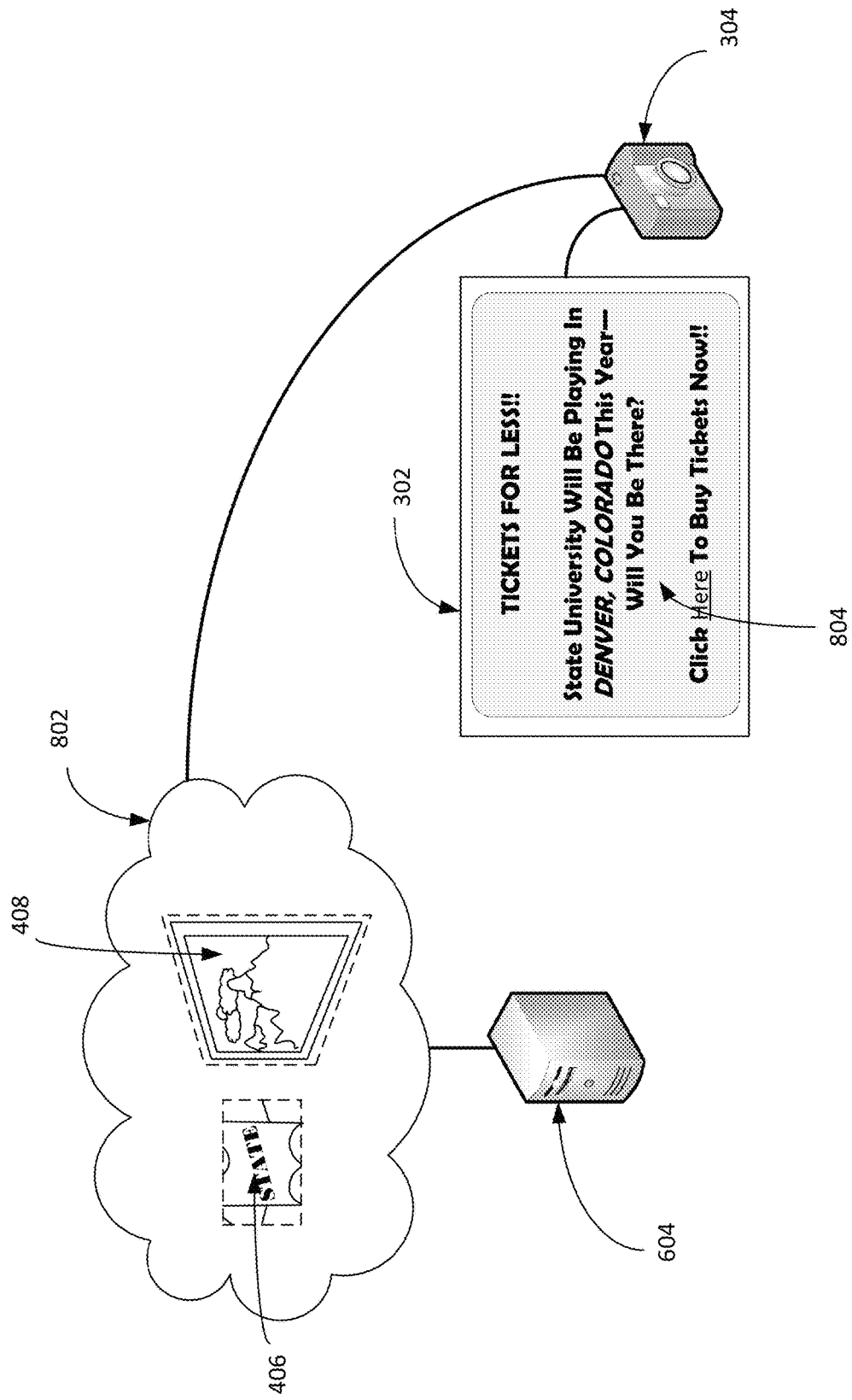
FIG. 8 illustrates another embodiment of additional content associated with more than one recognized objects from FIG. 5.

Moving to FIG. 8, one embodiment of the present disclosure is illustrated wherein additional content 804 is delivered based on a combination of recognized objects. Specifically, display device 302 associated with camera 304 from room 300 is once again depicted. However, in this example, multiple recognized objects from captured image 400 are processed and a combination of the matched objects is used to determine additional content 804. Specifically, in this embodiment, processor 604 processes both graphic object 406 and photograph object 408 as illustrated by processing cloud 802 and returns additional content 804. Here, additional content 804 is associated with more than one of the recognized objects; namely both graphic object 406 and photograph object 408. For example, processor 604 may determine graphic object 406 is associated with State University. Processor 604 may further determine photograph object 408 is associated with Denver, Colorado. Processor unit 604 may then return additional content 804 associated with both State University and Denver, Colorado. That is, processor 604 may, e.g., match multiple recognized objects (e.g., graphic object 406 and photograph object 408) to common additional content on the target list (e.g., additional content 804). In this embodiment, when the captured image 400 contains multiple objects, the processor 604 returns additional content 804 which corresponds to a combination of more than one of the recognized objects. In the example depicted, processor 604 returns additional content 804 associated with both graphic object 406 (associated with State University) and photograph object 408 (associated with Denver, Colorado); namely, an advertisement for tickets to an athletic event involving State University in Denver, Colorado. In this embodiment, multiple target objects on the target list may be associated with common additional content 804, and the processor may return additional content 804 when it determines more than one recognized object matches more than one target objects associated with common additional content 804.

Figure 9A:
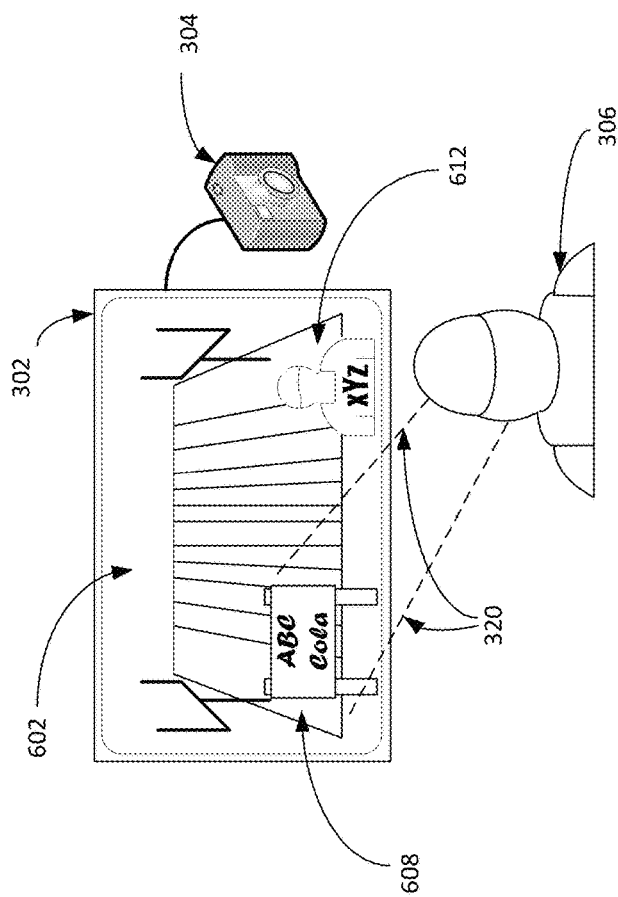
FIG. 9a illustrates one embodiment of content comprising a object.
Figure 9B:
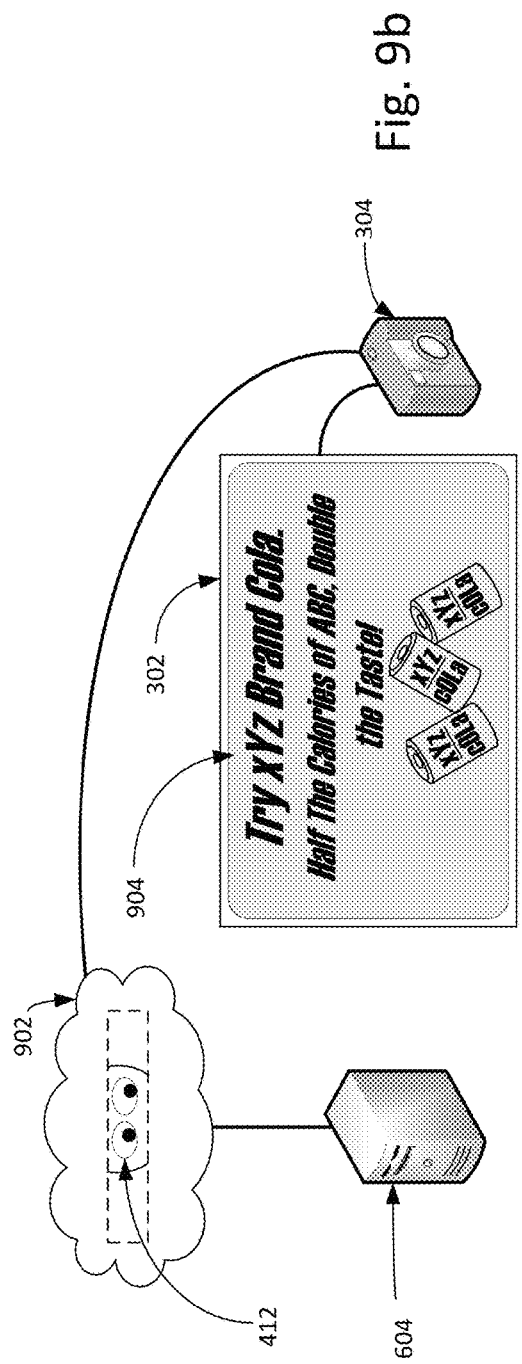
FIG. 9b illustrates one embodiment of additional content associated with a object.

The discussion above has addressed recognition of objects that are in the room with the viewer. In alternate embodiments, the present system can recognize the user's attention (e.g., the focus of their eyes), and deliver additional content based on areas of interest to the user. FIGS. 9a-9b illustrates one embodiment of the present disclosure wherein processor 604 returns additional content 904 according to objects to which user 306 is paying special attention. Specifically, user 306 is viewing content 602 on display device 302. Content 602 may contain one or more objects. For example, content 602 contains advertising sign 608 and spectator 612. Advertising sign 608 may be, e.g., a sign containing an advertisement placed along the side of a field at a major sporting event as is common in advertising. Spectator 612 may be, e.g., a person depicted on content 602 who has a logo or other identification on her clothing. In the example depicted in FIG. 9a, advertising sign 608 is associated with "ABC Cola," and spectator 612 is associated with "xYz Cola." It should be noted, as throughout the disclosure, the particular type and substance of the objects found in content 602 may vary greatly between various embodiments without departing from the present disclosure. Advertising sign 608 and spectator 612 are depicted for illustrative purposes only.

In FIG. 9a, user 306 is viewing advertising sign 608 as is depicted by broken lines 320. That is, user's 306 field of view is generally focused to the lower, left side of display device 302, the general location where advertising sign 608 is located. In FIG. 9b, additional content 904 is delivered based on processor 604 determining user 306 is viewing advertising sign 608. A data capture device captures data related to what is being viewed by user's eyes 412. For example, in the depicted embodiment, camera 304 captures image 400, and user's eyes 412 are recognized using any desired eye tracking technique. The captured data is then processed to determine what the user is viewing. In this embodiment, processor 604 processes user's eyes 412, as illustrated by processing cloud 902, to determine, e.g., that user 306 is generally viewing content in the lower, left side of display device 302, and that the user's attention has remained for longer than a predetermined minimum amount of time (e.g., 1 second). Processor 604 further determines that advertising sign 608 is located in the lower, left side of display device 302. Processor 604 may use a variety of methods to determine what object is located in the lower, left side of display device 302. For example, content 602 may be accompanied by information (e.g., metadata, manifest file, etc.) from the content provider or others, which instructs processor 604 as to the type and location of objects contained within content 602. In one embodiment, the content may be provided with a script indicating the type and location of each object on the displayed video image. Such a script may, e.g., divide the displayed image into discrete portions, and indicate which objects are located in each portion of the displayed image. An exemplary script may divide the content into four quadrants and indicate what objects appear in each quadrant. In the depicted example, the script may indicate that an "ABC" object is located in the lower, left quadrant, and an "xYz" object is located in a lower, right quadrant. This form of rough approximation of the onscreen location of objects of interest may assist the eye-tracking process, reducing the degree of accuracy required for the eye tracking. Alternatively, processor 604 may capture an image (e.g., a screen shot) of content 602 at substantially the same moment captured image 400 is captured, and use any of the aforementioned object recognition techniques to determine what types of objects, and the location thereof, are contained in content 602. Those skilled in the art will appreciate a variety of other well-known techniques to recognize the type of location of objects associated with content 602 without departing from the scope of this disclosure.

Returning to FIG. 9b, once processor 604 has determined that user 306 is viewing the lower, left side of display device 302, and that advertising sign 608 is located at the lower, left side of display device 302, processor 604 may return additional content 904 to display device which is associated with advertising sign 608. Specifically, in one embodiment, processor may compare the object associated with advertising sign 608 (i.e., "ABC Cola") with a target list of target objects. If processor 604 determines, e.g., "ABC Cola" matches a target object on the target list, processor 604 then determines if additional content is associated with the target object. In this example, additional content 904 is associated with "ABC Cola." Specifically, a competing product (i.e., "xYz Cola") has associated an advertisement with "ABC Cola." Thus, when processor 604 determines user 306 is viewing advertising sign 608 (as opposed to, e.g., spectator 612), it may return additional content 904. In this way, entities such as, e.g., advertisers, may target users depending on content they are interacting with. Specifically, entities may determine what objects users are viewing and deliver additional content accordingly.

Those skilled in the art will appreciate the embodiment depicted in FIGS. 9a-9b is not limited to advertisers of competing products. For example, in another embodiment, a content provider may charge an entity, e.g., an advertiser, depending on the number of views and/or the amount of time users view subcontent delivered with content 602. Increasingly, product placement is becoming more common in content due to, e.g., the advent of digital video recorders (DVR) and other technologies which allow user 306 to fast-forward or otherwise skip commercials. Therefore, data regarding whether user 306 viewed certain objects may be desirable even if additional content 904 is not associated with that object. For example, returning to FIG. 9a, content 602 includes advertising sign 608, which depicts "ABC Cola," and spectator 612, which depicts "xYz Cola." In one embodiment of the present disclosure, user's eyes 412, and/or multiple users' eyes in the aggregate, could be used to determine how much a particular entity owes for advertising. Specifically, a content provider of content 602 may track the number of instances user 306 looks at advertising sign 608 and/or the total amount of time user 306 spends looking at advertising sign 608, and charge ABC Cola a fee accordingly. Additionally, a content provider of content 602 may track the number of instances user 306 looks at spectator 612 and/or the total amount of time user 306 spends looking at spectator 612 and, and charge xYz Cola a fee accordingly.

In some situations, processor 604 may determine multiple objects in a room and/or detect that user 306 has viewed multiple objects in content 602 which are associated with competing entities. For example, processor 604 may determine room 300 contains objects associated with both ABC Cola and xYz Cola, or that user 306 has viewed objects associated with both ABC Cola and xYz Cola. In such a situation, processor 604 may return additional content corresponding to each of the detected objects/objects. For example, user 306 may be provided with commercials for a variety of products (e.g., one commercial for ABC Cola and one for xYz Cola).

However, entities (e.g., advertisers) may not wish to share their advertising space with other advertisers, particularly with competitors. Thus, in some embodiments, processor 604 may not display additional content associated with certain recognized objects and/or viewed objects. For example, entities may only wish to provide additional content to viewers if they are guaranteed their advertisement will be exclusive; i.e., if the objects associated with their additional content are the only recognized objects and/or if they are guaranteed other entities' additional content will not be displayed. In such embodiments, processor 604 may alter, or rather customize, the content 602 being viewed to provide an entity with exclusive advertising space. For example, an entity associated with advertising sign 608 (e.g., ABC Cola) may agree to pay a content provider based on, e.g., a number of views advertising sign 608 receives only if they are guaranteed an exclusive spot within content 602. In such an embodiment, processor 604 may block out the logo on spectator 612 (e.g., scramble the "xYz" logo on the shirt) and/or replace the logo at spectator 612 with graphical overlay of a logo depicting ABC Cola. In such an embodiment, an entity may pay a content provider for the rights to have their additional content preferred over, e.g., a competitor's additional content when objects associated with both entities are recognized.

In other embodiments, a content provider may provide content with generic product placements and replace such generic products with additional content according to any of the techniques discussed herein. For example, in some embodiments a content provider may provide content 602 with one or more objects (such as advertising sign 608 or spectator 612) that have either generic logos or no brand indicia associated with them. Processor 604 may then replace the generic object with a brand-specific object in response to any of the aforementioned object recognition techniques. For example, in one embodiment, processor 604 may recognize certain objects within a room and customize objects in content 602 accordingly (i.e., provide additional content as a graphical overlay on a generic product, such as through use of digital image replacement and graphical editing). In other embodiments, processor 604 may determine what objects user 306 views at one point in the content 602 and alter other generic objects in the content 602 accordingly. In this way, entities, such as advertisers, can reach their target audience using the teachings of this disclosure even if, e.g., user 306 is using DVR or technology and thus normally does not access traditional commercial spots by customizing generic products placed within delivered content.

In other embodiments, an entity may track user's 306 interest in objects for a variety of reasons. For example, ABC Cola may track user's 306 interest in objects, such as advertising sign 608, and compare this to, e.g., other advertisements depicting ABC Cola and/or other objects depicting other products (e.g., spectator 612) to count the amount of attention being given to each advertisement, and determine which advertising campaign is more effective. Alternatively, an entity such as, e.g., ABC Cola, may use an embodiment of the present disclosure in connection with a loyalty program. That is, ABC Cola may track user's 306 interest in advertising sign 608 and subsequently reward a user who views ABC Cola content on display device 302 more than a minimum number of times, or at a minimum frequency.

Similarly, one embodiment of the present disclosure may use further facial recognition techniques. For example, in addition to recognizing an object associated with user 306 accessing content and/or user's eyes 412 to determine which objects user 306 is viewing on display screen 302, one embodiment of the disclosure may use facial recognition to determine, e.g., an age of user 306. That is, an entity may associate various additional content with a target object on a target list, and may wish to tailor which of the various additional content it returns according to the user's 306 approximate age. In such an example, one embodiment of the disclosure may use facial recognition software to determine, e.g., which of a known plurality of users is accessing content (or present in the room). In such an embodiment, each registered user may have a stored image of herself in, e.g., a user profile (discussed more fully below) and the embodiment may recognize which user(s) is accessing content by capturing an image of the faces of those accessing content and comparing the captured faces to the stored image. Once determined, additional content can be tailored according to a user's age and/or stored preferences. In another embodiment, facial recognition may be used to approximate the age of user(s) accessing content using well-known facial recognition techniques (which will not be described at length here). In this embodiment, there may be more than one additional content associated with a target object, and the processor 604 will select which to return according to the user's age.

Figure 10:
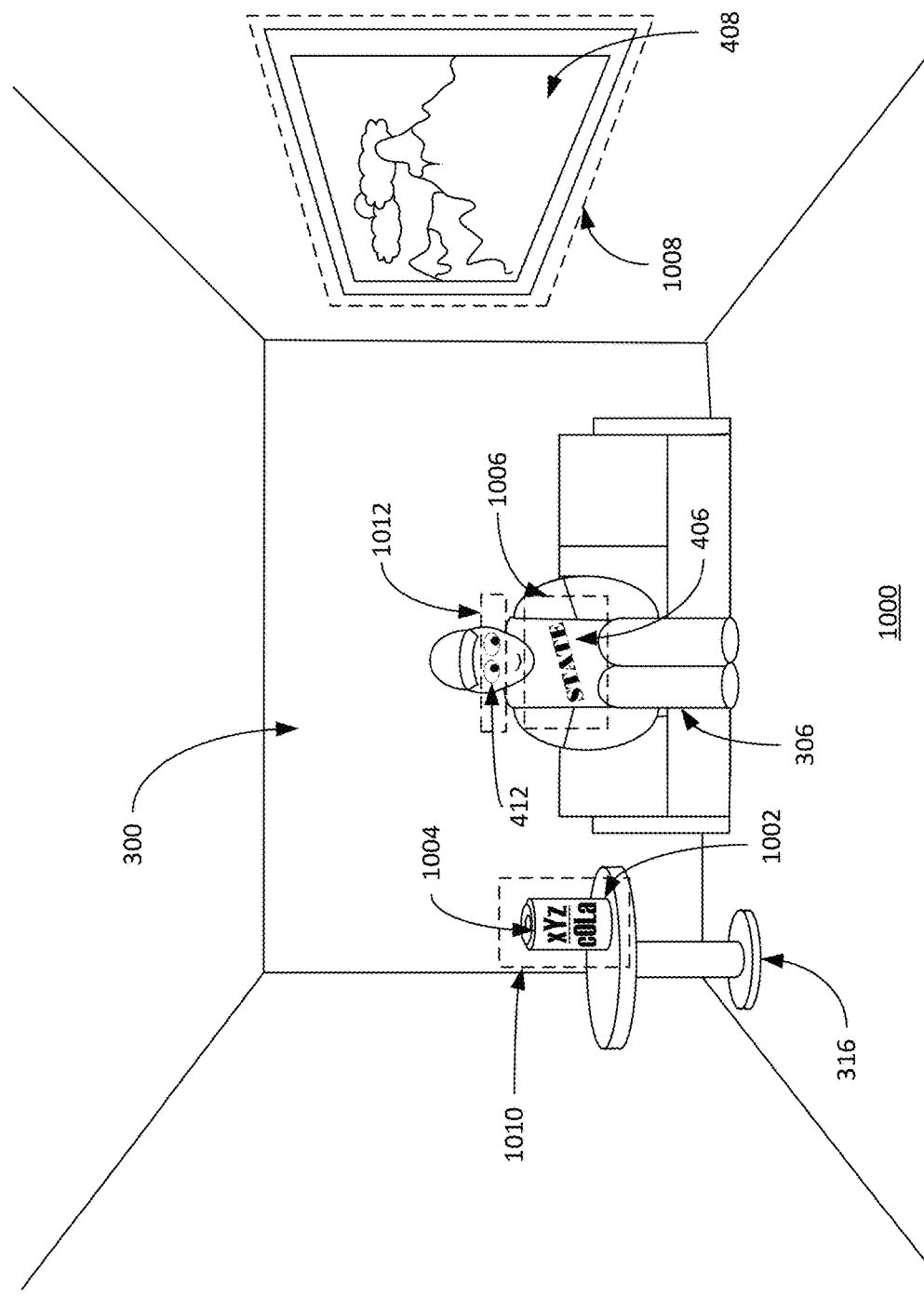
FIG. 10 illustrates recognition of example objects in an image captured later in time than the captured image of FIG. 4.

FIG. 10 is an example captured image 1000 which is captured later in time than captured image 400 of FIG. 4. Captured image 1000 is similar to captured image 400; however, in captured image 1000 there is a different type of cola on table 316. Specifically, cola can 1002 now sits atop table 316, which has the brand name "xYz Cola." As depicted by broken lines 1010, the illustrated embodiment recognizes brand name object 1004, corresponding to the "xYz Cola" brand name on cola can 1002. The embodiment may further recognize other objects in the captured image as well. For example, the embodiment depicted also recognizes graphic object 406, as represented by broken lines 1006, photograph object 408, as represented by broken lines 1008, and user's eyes 412, as represented by broken lines 1012. Returning to FIG. 5, three of these four recognized objects are the same as those recognized in captured image 400. Specifically, graphic object 406, photograph object 408, and user's eyes 412 were each recognized in captured image 400. However, brand name object 1004, which depicts "xYz Cola," did not appear, was thus not recognized, in captured image 400. In some embodiments, the newer object may be given a higher priority in determining what the additional content will be. For example, a weighting scale may be defined, with higher weights being given to objects that are new, or the scale may gradually reduce weights of objects as the object remains in subsequent images. Further, brand name object 410 and logo object 404, which were recognized in captured image 400 and depicted "ABC Cola," no longer appear in captured image 1000. The absence of objects from one image to the next may also be used. For example, the processor may be configured to note the absence of the soda can, and determine the duration of the object in the captured image (e.g., the can appeared in images captured over a 20-minute span), and that information can be relayed to the soda supplier for research purposes.

Figure 11:
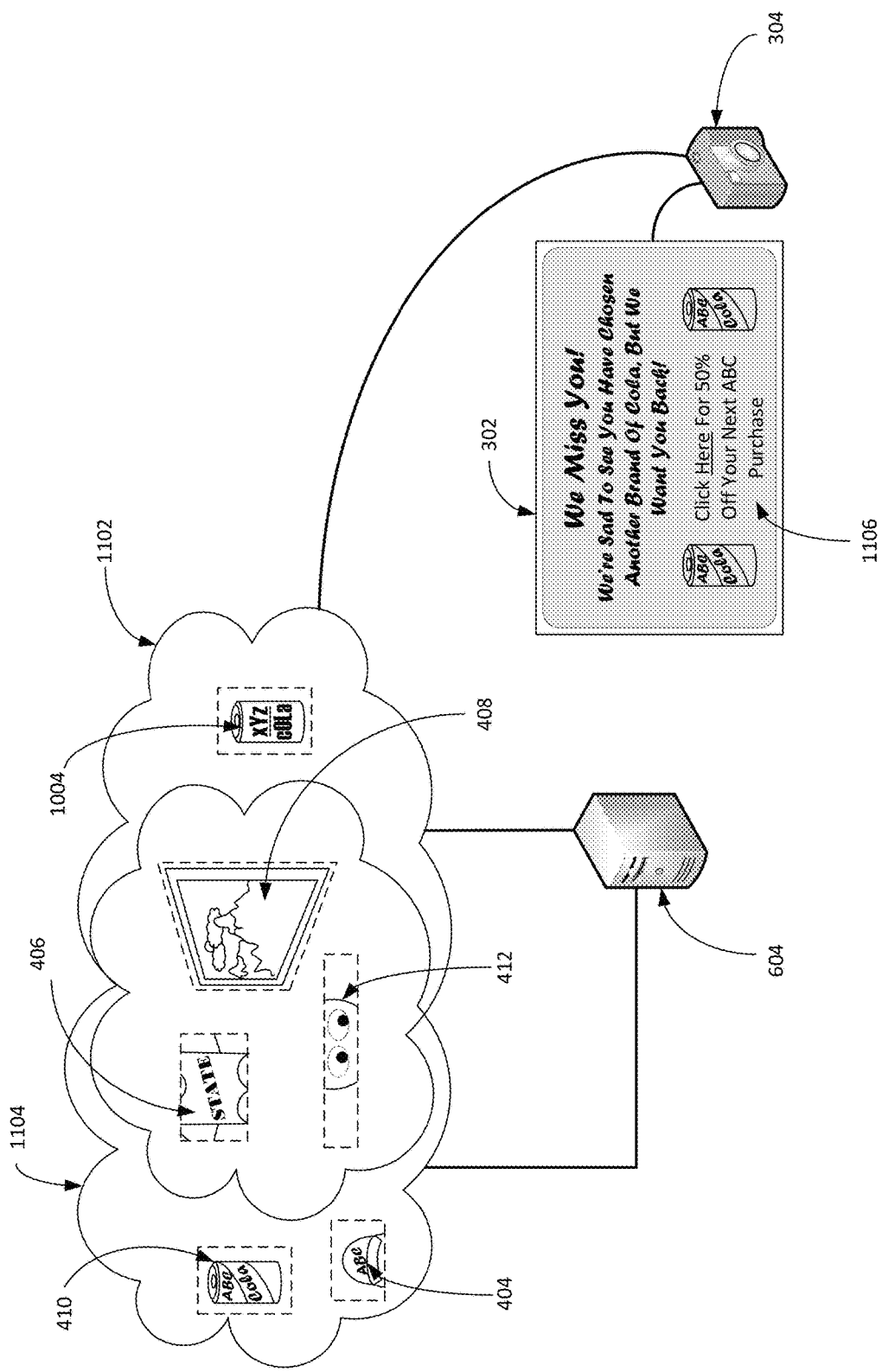
FIG. 11 illustrates one embodiment of additional content associated with more than one recognized objects over time.

FIG. 11 illustrates an embodiment of the disclosure in which processor 604 determines there has been a change in captured objects over time and returns additional content 1106 accordingly. Namely, in this embodiment, processor 604 compares the objects recognized in captured image 1000 with the objects earlier recognized in captured image 400. As illustrated by overlapping processing clouds 1102 and 1104, processor 604 determines there has been a change in the recognized objects in each captured image 400 and 1000. Specifically, processor 604 may recognize that graphic object 406, photograph object 408, and user's eyes 412 appear in both captured images. However, processor 604 may also recognize that brand name object 410, which appeared in captured image 400 and depicted "ABC Cola," and logo object 404, which appeared in captured image 400 and also depicted "ABC Cola," do not appear in captured image 1000, and that brand name object 1004, which appears in captured image 1000 and depicts "xYz Cola," did not appear in captured image 400. Accordingly, processor 604 may return additional content 1106. That is, in one embodiment, additional content may be associated in the target list with a change from objects depicting "ABC Cola" to objects depicting "xYz Cola." In this example, additional content 1106 is an advertisement by ABC Cola. In this way, entities can target users based upon their habits over time. In the example presented in FIG. 11, ABC Cola is targeting users who have potentially switched to xYz Cola for delivery of additional content 1106. Specifically, when processor 604 determines a switch from recognized objects associated with ABC Cola (e.g., brand name object 410 and logo object 404) to recognized objects associated with xYz Cola (e.g., brand name object 1004), processor 604 returns additional content (e.g., additional content 1106) in an attempt to have the associated user return to ABC Cola. Those skilled in the art will recognize such techniques are not limited to use by entities associated with the first recognized object. For example, in an alternative embodiment, xYz Cola may associate content in the target list with a change in recognized objects from ABC Cola to xYz Cola. In this example, xYz Cola can thus, e.g., reward or otherwise thank a user for making the switch.

In another embodiment, a change in user's 306 interest in objects appearing on the television or display screen may be used to return additional content 1106. Specifically, one embodiment may process a change in the objects user 306 views on display device 302. Returning to, e.g., FIGS. 9a and 9b, if, at a later time, processor 604 determines, by processing data related to what is being viewed by user's eyes 412, that user 306 is now viewing object associated with, e.g., xYz Cola frequently, processor 604 may process the change (i.e., the change form viewing advertising sign 608 to viewing xYz objects) and return additional content 1106 accordingly. For example, ABC Cola may target users who once were interested in ABC Cola objects (e.g., advertising sign 608) but who now often view xYz Cola objects.

Figure 12:
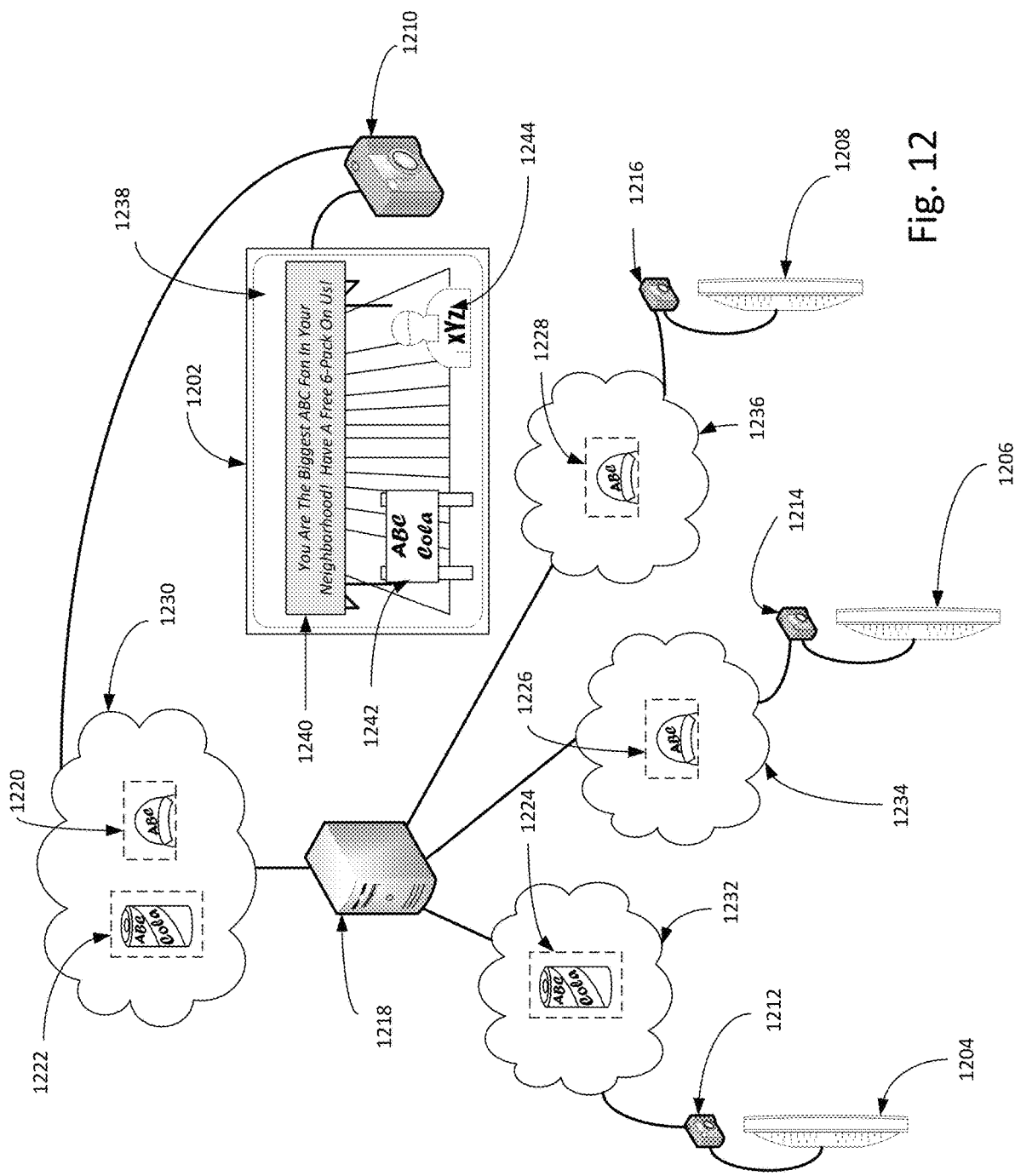
FIG. 12 illustrates one embodiment of displaying additional content associated with a plurality of recognized objects from a plurality of users.

FIG. 12 illustrates one embodiment of the present disclosure wherein multiple objects associated with multiple display devices and multiple users are processed to display additional content 1240 on display device 1202. Specifically, in this embodiment, display devices 1202, 1204, 1206, and 1208 are each associated with a different user, and communicatively coupled to a centralized server 1218. Centralized server 1218 may take, e.g., any of the various forms as discussed above. For example, centralized server may be located at local office 103. Further, centralized server 1218 may be push notification server 105, content server 106, and/or application server 107. Those skilled in the art will appreciate various embodiments of centralized server 1218 without departing from the scope of the disclosure.

Each display device 1202, 1204, 1206, and 1208 has an image or data capture device associated with it, such as, e.g., camera 1210, 1212, 1214, and 1216, respectively. Each camera may capture an image of a user and her surroundings while accessing content and recognize at least one object in the captured image, represented in FIG. 12 by recognized objects 1220, 1222, 1224, 1226, and 1228. Centralized server 1218 may then process each of recognized objects 1220, 1222, 1224, 1226, and 1228, and return additional content to at least one of the display devices 1202, 1204, 1206, or 1208.

In the example depicted in FIG. 12, a user is accessing content 1238 via display device 1202. In this example, content 1238 is a football game which includes objects advertising sign 1242 and spectator 1244. The user may have several items surrounding her while accessing the content 1238, and the camera 1210 may capture an image of the user accessing the content. In this example, the camera 1210 has captured and recognized, using any object recognition method well known in the art and/or described above, logo object 1220 and brand name object 1222. As described above, an image or data capture device may also capture data related to objects being viewed by user's eyes (not pictured). In the depicted example, cameras 1212, 1214, and 1216, have captured and recognized brand name object 1214, logo object 1226, and logo object 1228, respectively associated with other users accessing content at display devices 1204, 1206, and 1208. Again, cameras 1212, 1214, and 1216 or other data capture devices may also capture and recognize the user's eyes associated with each respective user accessing content. For simplicity, in this example only objects associated with ABC Cola are illustrated, but it should be well understood that cameras 1210, 1212, 1214, and 1216 may capture and recognize other objects besides objects associated with ABC Cola. In any event, centralized server 1218 determines that camera 1210, associated with the user accessing content at display device 1202, has captured more ABC Cola objects than any of the other cameras 1212, 1214, and 1216. Additional content 1240 is then returned to display device 1202. In this example, additional content 1240 announces to the user at display device 1202 that she is the biggest ABC fan in the neighborhood and offers her a free six-pack of cola. In one embodiment, an entity can thus promote their product by, e.g., establishing a competition among those accessing content and reward the user(s) who supports the company the most.

In the example depicted in FIG. 12, the number of users communicatively coupled to one another by centralized server 1218 may vary. For example, in the embodiment depicted in FIG. 12, the users are associated as being within the same geographic area; namely, the same neighborhood. Alternatively, the users could be from, e.g., a common workplace, school, church, or even a user-defined group associated with, e.g., social media. For example, instead of comparing the number of instances of recognized objects from one user to those of others in that user's neighborhood, the centralized server 1218 may compare the number of instances recognized objects from one user with, e.g., others as defined by the user's friend list on a social media website.

In an alternative embodiment, additional content 1240 may be retuned according to the objects of each user is viewing on each respective display device. Similar to the method as presented above with respect to FIGS. 9a-9b, centralized server 1218 may process data related to what is being viewed by each user's eyes to determine which object, if any, each user is viewing. For example, in the embodiment depicted in FIG. 12, content 1238 comprises objects including advertising sign 1242 and spectator 1244. Centralized server 1218 may determine, e.g., that a user at display device 1202 views advertising sign 1242 more times than the viewers at display devices 1204, 1206, and 1208. Alternatively, centralized server 1218 may determine, e.g., that a user at display device 1202 views advertising sign 1242 for a longer duration than other viewers. The centralized server 1218 may thus return additional content 1240 based on the viewing patterns of each user. Here, a user at display device 1202 is being rewarded as "the biggest ABC Fan" because she, e.g., viewed advertising sign more times and/or longer than the other users.

Figure 13:
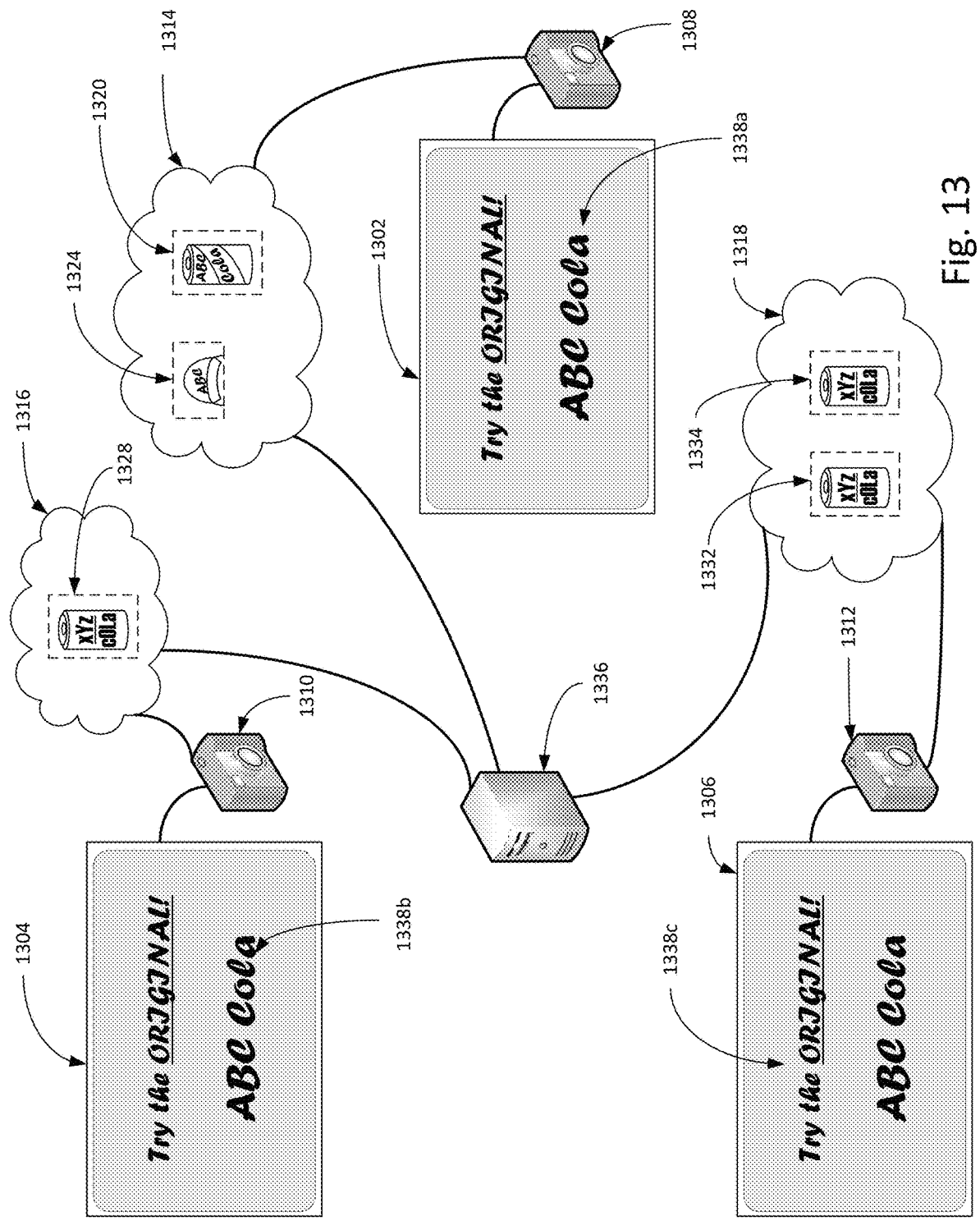
FIG. 13 illustrates another embodiment of displaying additional content associated with a plurality of recognized objects from a plurality of users.

FIG. 13 illustrates an embodiment of the disclosure wherein additional content is delivered to more than one display device according to recognized objects from more than one user. Specifically, display devices 1302, 1304, and 1306, associated with cameras 1308, 1310, and 1312 respectively, are each communicatively coupled to centralized server 1336. As with the above embodiments, centralized server 1336 may be any desired type of computer server, and may be, e.g., a push server 105, content server 106, and/or application server 107 located at local office 103. Objects 1320, 1324, 1328, 1332, and 1334, which are associated with users at each display device 1302, 1304, and 1306 as is understood with reference to the above description, are recognized. As presented above, recognition may be achieved by any well-known method in the art and may be performed, e.g., locally at each camera 1308, 1310, and 1312, or remotely such as at, e.g., centralized server 1336. Centralized server 1336 then processes each object 1320, 1324, 1328, 1332, and 1334, as illustrated by processing clouds 1314, 1316, and 1318 by, e.g., any of the aforementioned methods, and returns additional content 1338 to each display device (depicted at display devices 1302, 1304, and 1306 as 1338a, 1338b, and 1338c, respectively). In this embodiment, processor 1336 sends the same additional content 1338 to each display device 1302, 1304, and 1306, according to the aggregate matches of processed objects 1320, 1324, 1328, 1332, and 1334. For example, processor 1336 may associate objects 1320 and 1324, which both depict ABC Cola, to content associated with xYz Cola (e.g., if xYz Cola is targeting current ABC Cola customers). However, processor 1336 may also associate objects 1328, 1332, and 1334, which each depict xYz Cola, with content associated with ABC Cola (e.g., if ABC Cola is targeting current xYz Cola customers). In the aggregate, processor 1336 thus matches more objects to ABC Cola content (i.e., objects 1328, 1332, and 1334) than to xYz Cola content (i.e., objects 1320 and 1324). In the embodiment depicted in FIG. 13, processor 1336 then sends the same additional content 1338 to each display device 1302, 1304, and 1306. In this example, additional content 1338 is associated with ABC Cola. That is, because, in the aggregate, processor 1336 matched more objects in, e.g., a target list with content associated with ABC Cola than with content associated with xYz Cola, each display device receives additional content 1338 associated with ABC Cola. Thus, in this embodiment, an entity may target a large number of users based on, e.g., a majority preference of those accessing content at a given time. This provides entities with the ability to track their target audience in real-time, and respond with targeted additional content.

Of course, those skilled in the art will appreciate that the other various embodiments discussed above may be incorporated into the exemplary embodiment depicted in FIG. 13. For example, the embodiment depicted in FIGS. 9a-9b may be used in conjunction with the example depicted in FIG. 13. That is, each user, located at display devices 1302, 1304, and 1306, may be accessing content 602 which may comprise objects including, e.g., advertising sign 608 and spectator 612. Further, data capture devices associated with each display device, such as, e.g., cameras 1308, 1310, and 1312, may capture data related to what is being viewed by each user's eyes at display devices 1302, 1304, and 1306. Using techniques such as, e.g., those described in connection with FIGS. 9a-9b, the embodiment in FIG. 13 may then determine which objects each user is viewing. For example, the embodiment may track how long each viewer spends viewing, e.g., advertising sign 608, and how much time each user spends viewing spectator 612. Alternatively, the embodiment may count how many instances each user views each object. In any event, centralized server 1336 may then aggregate the information, and determine additional content 1338 to return accordingly. For example, in one embodiment centralized server 1336 may determine that on average users are viewing spectator 612, associated with xYz Cola, more than they are viewing advertising sign 608. In this example, ABC Cola may then have content associated with, e.g., xYz Cola, and thus centralized server may return additional content 1338 depicting ABC Cola in an attempt to divert users' interest from xYz Cola and to ABC Cola. Alternatively, xYz Cola may associate additional content 1338 with xYz Cola. That is, xYz Cola may be interested when, in the aggregate, users are viewing objects associated with xYz Cola, and thus follow-up with additional content 1338 depicting, e.g., xYz Cola to further interest in their product.

Figure 14:
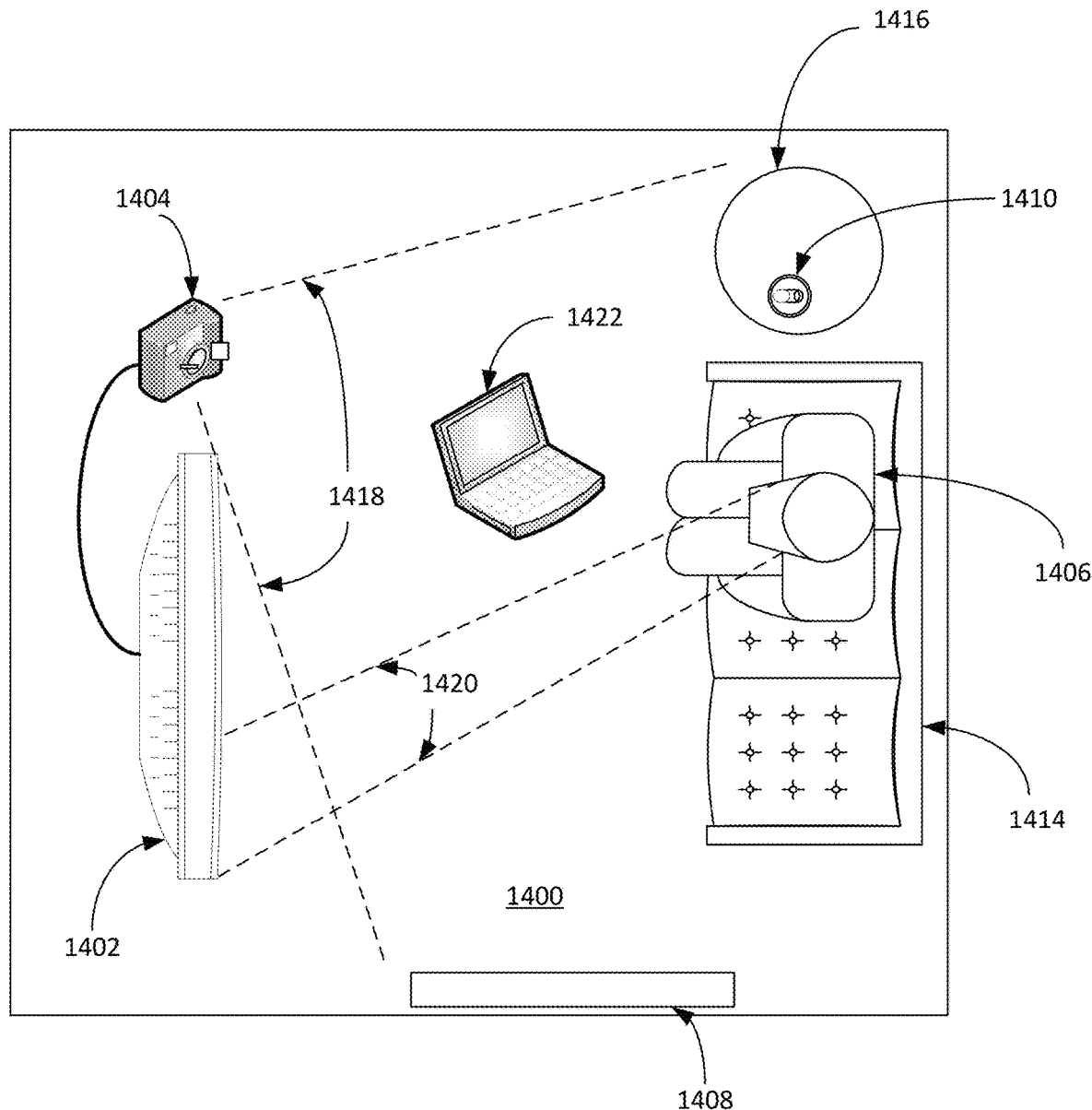
FIG. 14 illustrates a user's room comprising more than one display device as an example environment in which one embodiment of the present disclosure may be used.

FIG. 14 illustrates an embodiment of the disclosure utilizing more than one display device. Specifically, FIG. 14 illustrates a room 1400 comprising a display device 1402, a camera 1404 associated with the display device, a user 1406 sitting on a sofa 1414, a frame 1408, and a cola can 1410 sitting on a table 1416. In this respect, room 1400 and its contents are similar to room 300 as depicted in FIG. 3. However, room 1400 additionally contains second display device 1422. In this embodiment, second display device is depicted as a laptop computer, but, as with display device 1402, second display device 1422 may be any type of display device well known in the art and used for accessing content. For example, second display device 1422 may be a television set, desktop computer, tablet computer, smartphone, and the like. Broken lines 1418 represent a field of view of camera 1404. As discussed with respect to FIG. 3, the exact location and field of view of camera 1404 may vary depending on the particular embodiment of the present disclosure. In the example depicted in FIG. 14, broken lines 1418 represent a field of view which includes table 1416 with cola can 1410, sofa 1414 with user 1406, frame 1408, and second display device 1422. As is now well understood with reference to the previous figures and description, the camera 1404 and display device 1402 may capture an image of those items in camera's 1404 field of view, and applying, e.g., one of the aforementioned object recognition techniques, recognize objects associated with user 1406 accessing content on display device 1402. Broken lines 1420 represent user's 1406 field of view. That is, user 1406 may focus on area of the display device 1402 when, e.g., the display device 1402 displays objects of interest to the user. In the example depicted in FIG. 14, user 1406 is viewing content on the left side of display device 1402, as represented by broken lines 1420. As is understood with reference to the previous figures and description, a data capture device, such as, e.g., camera 1404, may capture data related to what is being viewed by user's 1406 eyes, and, in some embodiments, the data may be used to determine which, if any, objects on a display device 1402 user 1406 is viewing at any given time. Use of this dual-screen configuration is discussed with respect to FIG. 15.

Figure 15:
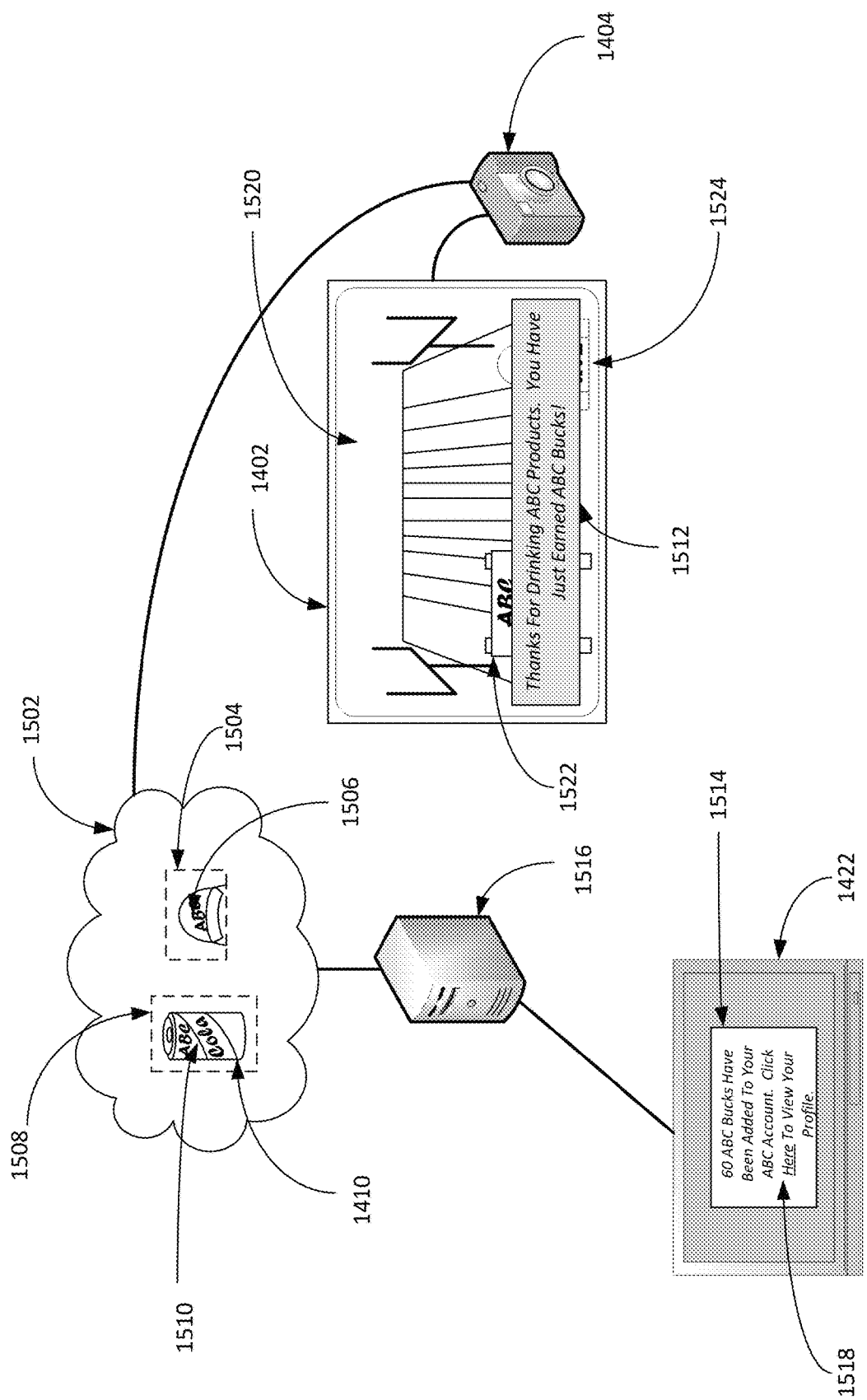
FIG. 15 illustrates one embodiment of displaying additional content on more than one display device associated with a user.

FIG. 15 illustrates an embodiment according to one aspect of the disclosure in which additional content is displayed on more than one display screen associated with a user. In this embodiment, display device 1402, camera 1404, and second display device 1422 are all communicatively coupled to processor 1516. As with the above embodiments, processor 1516 may be local to any device pictured, or may be, e.g., a centralized server. Further, display device 1402, camera 1404, and second display device 1422, may be communicatively coupled by any means well known and appreciated by those skilled in the art. This embodiment, using one of the various techniques as explained above, recognizes brand name object 1510 on cola can 1410, as represented by broken lines 1508, and logo object 1506, as represented by broken lines 1504. Processor 1516 processes these recognized objects as represented by processing cloud 1502 by, e.g., any of the aforementioned methods, and returns additional content 1512 and 1514 associated with the brand name object 1510 and/or logo object 1506. However, in this embodiment, processor 1516 returns additional content 1512 and 1514 to more than one display device associated with a user. The additional content 1512 and 1514 may be, e.g., the same on each display device (e.g., a common advertisement) or may differ on each display device. For example, in the embodiment depicted in FIG. 15, processor 1516 returns additional content 1512 to display device 1402, and returns additional content 1514 to second display device 1422. In this example, the content is complementary to, but different from, content that is being displayed on the display device 1402. As another example, on display device 1402, the first additional content notifies user 1406 that they have just earned ABC Bucks. This may be, e.g., in connection with a loyalty program. Thus, when camera 1404 captures images containing objects associated with ABC Cola, ABC Cola may reward user 1406 by returning loyalty points (in this example referred to as "ABC Bucks"). Additional content 1514, displayed on second display device 1422, notifies user 1406 that ABC Bucks have been added to a user account, and provides a link 1518 for the user 1406 to access the account. Those skilled in the art will appreciate that additional content 1512 and additional content 1514 need not be delivered and/or accessed at the same time. For example, in one embodiment, the second additional content 1514 may be delivered via, e.g., email, and accessed by user 1406 at a later time. Alternatively, the second additional content 1514 may not be displayed until, e.g., user 1406 accesses her account at a later point in time.

The various embodiments of the present disclosure as discussed herein may be employed within the embodiment depicted in FIG. 15. For example, the embodiment may instead capture data related to what is being viewed by user's 1406 eyes and determine what objects she is viewing. For example, returning to FIG. 14, user 1406 is generally viewing the left side of display device 1402, as represented by broken lines 1420. A data capture device, such as, e.g., camera 1404, may capture data related to what is being viewed by user's 1406 eyes and determine, e.g., that she is generally viewing the lower, left side of display device 1402. The content 1520 being displayed at that time may include one or more objects. For example, content 1520 may include an advertising sign 1522 and spectator 1524. Upon determining that user 1406 is generally viewing the lower, left side of display device 1402, the embodiment may determine that this is associated with advertising sign 1522, which depicts an advertisement for ABC Cola. User 1406 may then be, e.g., rewarded for spotting ABC Cola object within content 1520, and additional content 1512 may be returned to display device 1402 and additional content 1514 may be returned to second display device 1422 to notify user 1406 of the reward. Alternatively, the embodiment of FIG. 15 may process captured images associated with more than one user, as presented in various above embodiments, and return additional content to more than one display device accordingly.

In the above examples, additional content need not be returned to both display devices. For example, in some embodiments, additional content may only be returned to a second display device. Thus, in the example depicted in FIG. 15, additional content may only be returned to second display device 1422. That is, camera 1404 may capture an image, and processor 1516 may process a recognized object from the captured object (e.g., brand name object 1510 or logo object 1506), but, rather than returning both additional content 1512 and additional content 1514, the embodiment may only return, e.g., additional content 1514. In this embodiment, user 1406 may be presented with additional content 1514 immediately (e.g., by email, popup window, text message, etc.) or may be presented with additional content 1514, e.g., next time she uses second display device 1422. Thus, in this embodiment, camera 1404 may capture an image containing objects surrounding user 1406 accessing content on display device 1402 and/or capture the position of user's 1406 eyes and determine objects on display device 1402 the user is viewing, but, rather than return additional content to display device 1402, additional content is returned to second display device 1422 (e.g., desktop computer, laptop computer, smartphone, tablet computer, and the like). User 1406 may then access this additional content either immediately or, e.g., the next time user 1406 uses second display device 1422.

FIGS. 16a-16d illustrate example embodiments of user interfaces which may be associated with the present disclosure. In FIG. 16a, display 1600 contains profile creation menu 1602. Profile creation menu 1602 may allow a user to create a profile according to one embodiment of the present disclosure. Profile creation menu 1602 contains radio buttons allowing a user to indicate whether or not she would like to setup a profile. If she would, profile creation menu 1602 may allow the user to store, e.g., her name, email, and password for accessing her profile at a later date. Those skilled in the art will recognize many common features of a profile creation menu 1602 that may be incorporated herein. For example, profile creation menu 1602 may further allow a user to upload an image, or avatar, to be associated with the profile. Profile creation menu 1602 may also allow a user to create a unique identifier, or profile name, to be used at subsequent logins.

Turning to FIG. 16b, two additional user interfaces are depicted according to aspects of the disclosure. Specifically, capture authorization menu 1604 and capture scheduler menu 1606 are displayed on display device 1600. If a user has created and stored a profile, such as by using the profile creation menu of 1602, a user may enter her preferences in capture authorization menu 1604 and capture scheduler menu 1606 only periodically, with processor 604 or the like storing her preferences for reference each time she accesses content. Alternatively, the user may specify her preferences each time she access content, such as when she powers on a display device 1600. Those skilled in the art will appreciate that a number of ways prompting a user, receiving user input, and storing or using user input may be employed without departing from the scope of this disclosure.

Capture authorization menu 1604 prompts a user for approval to capture images by a camera associated with display device 1600. For example, some users may not want a camera to capture images of them and their surroundings when they are accessing content. Accordingly, a user could setup a profile and select "No" in response to "OK To Capture Images?" Alternatively, a user may not care if a camera captures images of them and their surroundings while accessing content, and accordingly a user could select "Yes" in response to "OK To Capture Images?" In some embodiments, such a message may be displayed each time the processor wishes to use a captured image, and the user may be given the option of denying approval for a particular captured image after seeing what has been captured.

Capture scheduler menu 1606 may allow a user to customize times when a camera associated with display device 1600 captures images. For example, if a user does not care if a camera captures images of her and her surroundings while she accesses content, but the user does prefer not to have images captured during a certain time, capture scheduler menu 1606 allows the user to input preferable times for image capture. In one embodiment, capture scheduler menu 1606 may further include, e.g., a calendar which allows a user to authorize image capture according to specific days of the week. In an additional embodiment, a user may not care if a camera captures an image of her surroundings, but prefers the camera does not capture an image of her. In this embodiment, capture scheduler menu 1606 may further include an option which allows a user to specify that images may only be captured when she leaves the room and/or field of view of the camera.

Personalized message 1608 in FIG. 16c presents yet another embodiment of a user interface according to some embodiments of the disclosure. Specifically, a content provider (in this example, ABC Cola) sends a user personalized message 1608 inviting the user to, e.g., create a profile. For example, in the embodiment depicted, personalized message 1608 presents an invitation from ABC Cola for the user to "Start Earning ABC Bucks." This may be sent in response to, e.g., processor 604 determining that a recognized object in a captured image is associated with ABC Cola on a target list. Alternatively, this may be sent in response to, e.g., processor 604 determining that a user is viewing objects on display device 1600 that is associated with ABC Cola. Further, in the embodiment illustrated in FIG. 16c, personalized message 1608 contains a link 1612, which allows a user to access another menu (in this embodiment to, e.g., sign up for an ABC rewards account). Link 1612 may be any link as is well known to those in the art. For example, link 1612 may be a hyperlink displayed on a personal computer, tablet computer, or smartphone display screen. Accordingly, a user may select the link using, e.g., a mouse, keyboard, touch screen, or any other input device, after which they will be directed to another screen. Alternatively, the link may appear on, e.g., a television screen and be selected by the user using, e.g., a remote control or other input device. Those skilled in the art will also appreciate that links, such as link 1612, can be associated with any of the embodiments as depicted throughout the disclosure. For example, a link could be incorporated with, e.g., additional content 804 as depicted in FIG. 8, additional content 1106 as depicted in FIG. 11, or additional content 1514 as depicted in FIG. 15.

Returning to FIG. 16c, in one embodiment, when a user accesses link 1612 they are redirected to a different screen or menu. For example, link 1612 may redirect a user to a menu where they can create a profile, such as profile creation menu 1602. Alternatively, the user may be directed to a screen that contains, e.g., a coupon or other downloadable or otherwise accessible content.

Turning to FIG. 16d, an example feedback menu 1610 is presented. Feedback menu 1610 may include, e.g., a representation 1614 depicting a recognized image. Feedback menu 1610 may present the user with representation 1614 of a recognized object, alerting her that the system has captured an image containing the recognized object. In this embodiment, feedback menu identifies to the user that representation 1614 is associated with the ABC Cola. Feedback menu 1610 may further provide a user with options regarding the additional content associated with the object as depicted in representation 1614. For example, feedback menu 1610 may allow a user to opt out of receiving content from an entity associated with the object. Alternatively, feedback menu 1610 may allow a user to opt in to future content from an entity associated with the object regardless of any subsequent matches. Those skilled in the art will appreciate a myriad of other options that may be presented to a user through feedback menu 1610 without departing from the disclosure. Further, if a user has, e.g., a profile or other account established, such as by, e.g., completing the profile creation menu 1602, one embodiment of the disclosure may remember the user's preferences, as entered through feedback menu 1610, when accessing future content. For example, if the user selects the option "Never Display Content From ABC" when logged in to, e.g., a profile or user account, processor 604 may not return additional content in the future whenever the user is logged in even if a subsequent recognized object matches a target object on the target list associated with ABC Cola.

Figure 17:
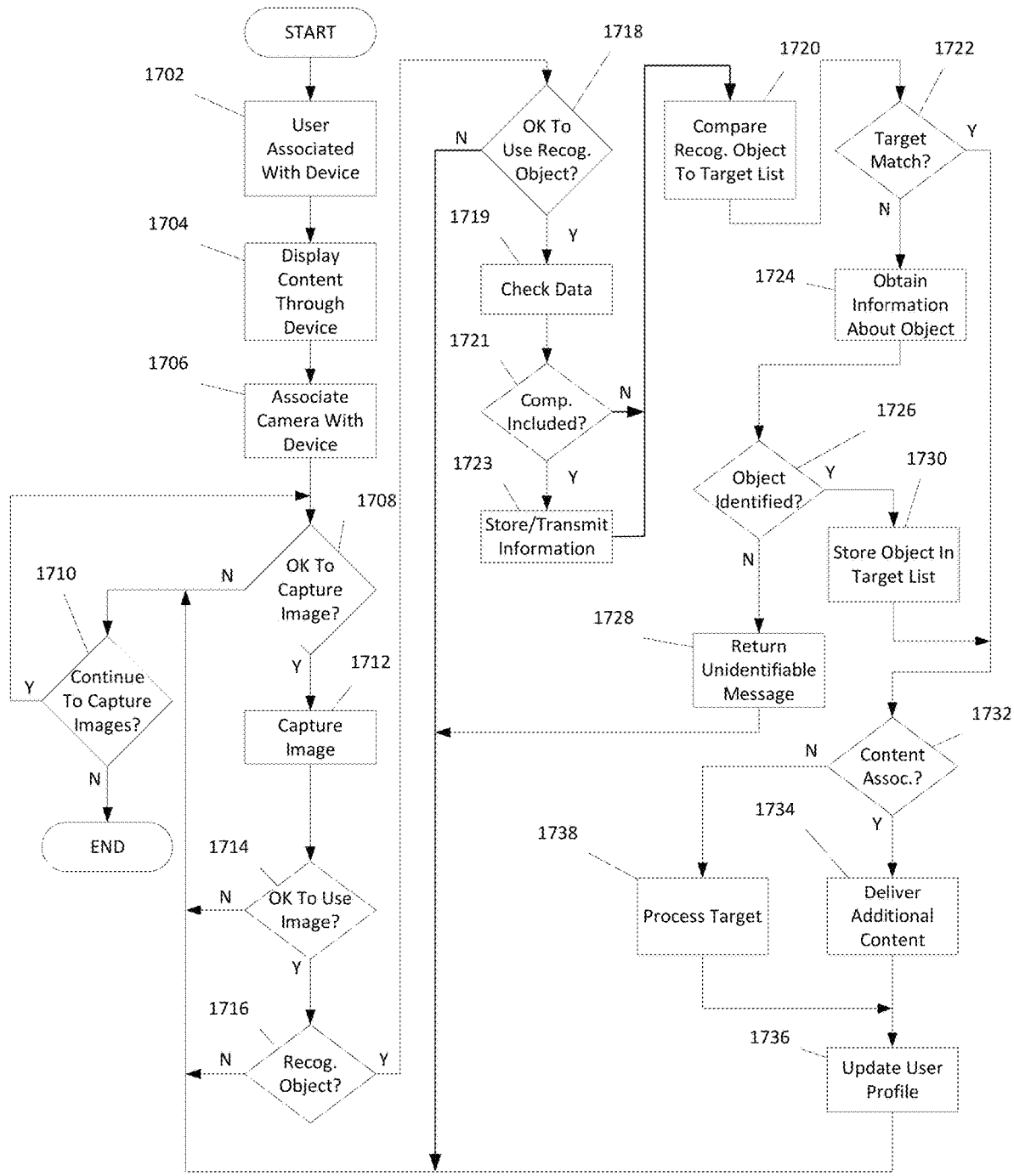
FIG. 17 illustrates an exemplary flowchart of a method in accordance with one embodiment of the disclosure.

FIG. 17 depicts a flowchart for an exemplary method according to one embodiment of the disclosure, which can be performed by one or more computing devices such as a gateway 111, display device 112, computing device 114, server 107, or any other desired computing device. When describing the steps of the method below, the term "system" will be used when referring to each component, either singularly or collectively, employed at each step of the method. Such usage is merely for ease in discussing the method, and should not be interpreted as limiting the exact embodiment in which the following method may be performed.

At step 1702, a user is associated with a consumption device such as display device. In some embodiments, a user may be associated with the display device merely by turning on the display device in order to access content. In other embodiments, a user may, e.g., login to a profile associated with her. That is, a user may have set up a profile using, e.g., any of the user interfaces presented above and thus may have stored preferences regarding, e.g., when a camera may capture images of her accessing content. In still another embodiment, a user may be prompted at step 1702 to create a profile and store preferences. In this embodiment, when a user powers on a display device, she may be presented with a user interface asking for, e.g., a user name and password in order to access preferences in a stored profile. If the user has not yet setup a profile, she may be presented with an option to create a profile. At this time, the user may thus input information about herself and/or image capture preferences. For example, as presented above in connection with FIGS. 16a-16d, the user may specify she only wants images captured during certain times of the day, or, e.g., when she is accessing a certain type of content. If the user stores these preferences at step 1702, the system may then access such preferences at a later time as will be discussed in more detail below. Alternatively, if the user is not prompted to enter login information at step 1702 and/or the user declines to login or setup a profile, the system may act in a default mode, wherein images are captured at all times or captured according to, e.g., a preloaded default image capture scheduler.

At step 1704, the system presents content to a user through a display device. Such a display device may be any device, including, but not limited to, a television, desktop computer, laptop computer, tablet computer, smartphone, and the like. Further, the content may contain objects as discussed more fully above. In such embodiments, the content may be provided with data (e.g., metadata, manifest file, script, etc.) indicating where in the content each object is located. At step 1706, the system associates a camera (or any image or data sensing or capturing device) with the display device. As presented above, such camera may be integral to the display device, as is common in, e.g., televisions, personal computers, tablet computers, smartphones, and the like, or the camera may be external to the display device and operatively coupled to the display device.

At step 1708, the system determines whether or not the camera is authorized to capture an image. As presented above, when a user is associated with the display device at 1702, she may have entered user-specific preferences regarding when the system is authorized to capture images, and such preferences are referenced at step 1708 to determine if the system is authorized to capture an image at this time. Alternatively, the user may have merely, e.g., powered on the display device and not entered user-specific preferences. Thus, the system may determine it is authorized to always capture images and/or check a default image capture scheduler to determine if it is currently authorized to capture images. For example, in one embodiment, a user may have not authorized images to be captured of her and her surroundings while accessing content. In another embodiment, a user (and/or a default scheduler) might have specified certain times when the camera is authorized to capture images of her and her surroundings while accessing content, and the system determines if the current time is within an authorized window. In still another embodiment, a user (and/or a default scheduler) may have specified that the camera is only authorized to capture images once the user has left the room, and the system determines whether or not the user has left the room before capturing an image. In still another embodiment, the user (and/or a default scheduler) may have specified certain content during which the system is authorized to capture an image, and the system will determine what type of content is being accessed on the display device and whether or not it is authorized to capture an image during the displayed content. Even when a user profile permits it, the capturing of an image need not occur continuously. Instead, the device may capture images only at predetermined time intervals (e.g., once every 10 minutes), or in response to certain events (e.g., initial turning on of display device, changing channels, etc.). If the system determines it is not authorized to capture an image, or that an image is not to be captured, the method proceeds to step 1710. If the system determines it is time to capture an image, the method proceeds to step 1712.

At step 1710, the system determines whether or not it should continue to capture images. For example, in one embodiment the display device may be powered off by the user, and in such an event the system will determine it should no longer capture images and the method thus ends. In another embodiment, the user may disable the camera and/or capture function (through, e.g., a user interface) and the method thus ends. In any event, when the system determines it should no longer capture images, the method ends. However, if the system determines it should continue to capture images, the method returns to step 1708. For example, the system at step 1708 may have determined it is not currently authorized to capture images because, e.g., the current time is not within a user-specified authorized window, or the content the user is accessing is not content during which the system is authorized to capture an image, or the user is currently in the room and the user has not authorized image capture while the user is in the room. In such examples, the system will determine at step 1708 that it is not authorized to currently capture an image, but will determine at step 1710 that it should continue to attempt to capture images. Thus, the method continually cycles through steps 1708 and 1710 until the system is ultimately authorized to capture an image or the system determines it should no longer attempt to capture images and thus the method ends.

Once the system determines it may capture an image at 1708, the method proceeds to step 1712. In step 1712, the system captures an image or other data using the camera or other image or data capture device. In one embodiment, such an image may be, e.g., of a user and her surroundings while the user is accessing content. In other embodiments, the image may be, e.g., of a room after the user has left. In still other embodiments, data related to what is being viewed by the user's eyes may be captured. In some embodiments, a user may be presented with the image for approval at step 1714. In one embodiment, the user may receive a prompt on the display device informing her that an image has been captured, and the user may be asked for permission to further process the image. In another embodiment, the user may be presented with a representation on the screen of the captured image and may be asked for permission to further process the image. Thus, at step 1714 the user may be able to immediately determine if she wants to further process the image. If, for any reason, the user does not want the system to process the image, the user at step 1714 can decline permission to proceed. In such an event, the captured image may, e.g., be immediately deleted, and the method would return to step 1710 and proceed through each step as presented herein. However, if the user approves of the system further processing the image, she may give her permission at step 1714 for the system to use the image, and the method proceeds to step 1716.

In step 1716, the system processes the image or data to determine and/or recognize any objects contained within the captured image and/or the gaze of the user's eyes (e.g., what portion of the content the user is viewing). This may be accomplished by, e.g., any method of object recognition which is well known in the art and/or as described above. If the system does not recognize an object and/or what portion of the content the user is viewing by, e.g., any of the aforementioned techniques, the method proceeds to step 1710 and the system determines, as explained above, if it should capture further images or data. However, if the system recognizes one or more objects or the portion of the content the user is viewing at step 1716, the method proceeds to step 1718.

At step 1718, the system determines if it is authorized to use the recognized object. For example, as presented in the various embodiments above, a user may have a profile associated with her. In such a profile, the user may have, e.g., specified certain objects that she does not want to be used to return additional content. Returning to FIG. 16d, the user may have specified, in response to, e.g., additional content 1610, that she does not wish to receive additional content associated with objects resembling ABC Cola. In such an embodiment, the system at step 1718 will not use a recognized object if associated with ABC Cola, and thus the method returns to step 1710 and proceeds through each step as described herein. Alternatively, the system may prompt the user at 1718 and ask her whether or not the system may use the object to search for and/or return additional content. For example, a representation of the recognized object may be presented to the user through the display screen, and the user may indicate whether or not the system is authorized to process the recognized object and search for and/or return additional content accordingly.

If the system is authorized to use the recognized object at step 1718, the method proceeds to step 1719. At step 1719, the system may check data associated with the content, such as a script. For example, the content provided may have data associated with it (e.g., a script, metadata, manifest file, etc.) which provides, e.g., what objects are located within the content and/or the location of the objects. At step 1719, the system may thus access the data associated with the content (e.g., by referencing a script, metadata, manifest file, or by searching a network, etc.) to see if objects are associated with the content. At step 1721, the system determines, from accessing the data at 1719, whether or not objects are included in the content. If objects are not included, the method proceeds to step 1720. However, if objects are included, the method proceeds to step 1723, where the system may store or transmit information associated with the objects. For example, at 1723 the system may store information regarding if and how long the user viewed the object to be later used to, e.g., charge an advertiser as discussed above.

After the system stores and/or transmits information relating to the user's interaction with one or more objects, the method proceeds to step 1720. In step 1720, the system compares the recognized object and/or determined objects the user interacted with to target objects on a target list (this step, and the processing of objects/objects herein, may be repeated for each identified object). The target list may be either local to, e.g., the camera and/or display device, or the target list may be located remotely from the camera and/or display device. For example, in some embodiments the target list may be stored in memory operatively coupled to a processor that is integral to, e.g., the camera and/or the display device. In another embodiment, the system may transmit the recognized object to, e.g., a centralized server. In any event, the objects as recognized in step 1716 are compared to a target list either locally or remotely. Optionally, data related to what is being viewed by a user's eyes may be used at step 1720 to determine, e.g., objects on the display screen the user is viewing using any method as discussed more fully above. An object the user is viewing on the screen may then be compared to the target list at step 1720. At step 1722, the system determines whether or not the recognized object matches a target object in the target list. If the recognized object matches, beyond a minimum threshold similarity match, a target object in the target list, the method proceeds to step 1732. If, however, the recognized object does not match (or, alternatively, does not fully match as will be discussed below) a target object in the target list, the method proceeds to step 1724.

At step 1724, the system receives information about the recognized object in an attempt to identify the object. For example, in one embodiment the system may return an imperfect match at step 1722. That is, the image may not be a close enough match to be deemed a strong match, but it may be close enough to be a weak match. For example, returning to FIG. 5, the system may match brand name object 410 to a target object associated with ABC Cola because the system has a prestored image of the can that matches well, but may not immediately match logo object 404 on the hat to ABC Cola because the system does not have a stored image of the hat with the logo (e.g., perhaps the system only has a stored image of the logo itself, without the hat). In one embodiment, the system may determine that the logo object 404, although not identically matching with its prestored images, is at least a partial match based on the ABC logo. The system may then return to user 306 a prompt, containing, e.g., a representation of logo object 404, and ask the user whether the recognized object is associated with the imperfectly matched target object, here a target object associated with ABC Cola. The user may then be able to either confirm or deny the object is associated with the imperfectly matched target object.

In other embodiments, such as when, e.g., the system has not returned an imperfect match, the user may be prompted to input information regarding the unmatched recognized object at step 1724. For example, returning to FIG. 6c, the user may be presented with, e.g., representation 618 of an unrecognized object. In such an embodiment, the user may be further prompted to enter information about the object. For example, the user, when presented with a representation of photograph object 408, may input information such as "mountains" or "Denver, Colorado." Alternatively, the user may enter, e.g., a URL associated with the object or any other information to assist the system in matching the object. The system may then use this inputted information to attempt to match the object. For example, the system may compare the inputted keywords to keywords of stored target objects on the target list. If the keywords lead to an imperfect match (i.e., the system guesses a target object may be associated with the recognized object) the user may then be further prompted to confirm the imperfect match as presented above. In other embodiments, the system may send the representation to a remote computing device comprising a broader database in an attempt to match the target object. In still another embodiment, the system may use, e.g., web queries or internet searches to ultimately match the recognized object to a target object.

If the recognized object is ultimately identified, the system may then, optionally, store the object and/or associated information in the target list at step 1730. In this manner, the object may be more easily matched in the future and/or may have additional content associated with it for future matches. In order to facilitate such broadening of the target list in each embodiment, the user may be, e.g., rewarded for helping identify the recognized object. For example, as presented above, a user may have set up a profile associated with a loyalty program for certain entities. Upon helping identify new objects associated with that entity (by, e.g., confirming a partial match or entering information for an unmatched object), the user may receive loyalty points or other promotional offers. In this way, users may be incentivized to help improve a target list, and thus the target list may be ever-evolving. The system may also catalogue the locations, devices, addresses (e.g., IP addresses) of the places where matches were found. The aggregated information may be stored and presented to the user if desired. The information can identify, for example, the percentage of a user's neighbors who have the same soda can in their house. After the object is stored in the target list, the method proceeds to step 1732 which will be discussed more fully below.

If the recognized object is ultimately not identified, the system may return an unidentifiable message at step 1728. In one embodiment, the unidentifiable message may be returned to a user. In such an embodiment, the user may be presented with a representation of the object and a message indicating the object was not successfully identified using any of the techniques as discussed above. Alternatively or additionally, an unidentifiable message may be sent to, e.g., a centralized server. In such an embodiment, a representation of the unidentified object and any information inputted by the user may be returned to a server. This information later may be used to ultimately identify the object and update the target list for future applications. In any event, if the object ultimately remains unidentified, the method, after the system returns an unidentified object message at step 1728, returns to step 1710, and proceeds through each step as described herein.

Returning now to step 1722, if the system does match the object to a target object on the target list, the method proceeds to step 1732. Further, if the system ultimately identifies the object at step 1726 (through either, e.g., the assistance of a user or a successful web query), the method ultimately proceeds to step 1732 after, optionally, storing the object in the target list at step 1730 as described above. At step 1732, the system determines whether there is additional content associated with the target object on the target list. Some objects may be successfully matched to target objects at 1722, or alternatively successfully identified at step 1726, however, no additional content will be associated with the target object on the target list. For example, in the various examples depicted above, in some embodiments there may not be any content associated in the target list with, e.g., graphic object 406. That is, the method may recognize graphic object 406, and the method may even match graphic object 406 to an object on the target list (namely, an object associated with State University). However, State University (or any other entity for that matter) may not have yet associated additional content with the target object. In such an embodiment, therefore, the system will not have additional content to return to a display device. The method proceeds to step 1738, where the system processes the target. At step 1738, the system may, e.g., update a count of how many times the target object has been matched. That is, the system may track the popularity of certain target objects, and entities may later access such statistics and ultimately decide whether or not to associate additional content with the target object. The method may also return a message to entities associated with the target object alerting them that the target object has been matched. In this way, entities may continually receive updates regarding how often certain objects are recognized in captured images, and may thus, e.g., base future decisions regarding which objects to associate additional content with accordingly.

However, if additional content is associated with the target object in the target list, the method proceeds to step 1734. In step 1734, the system delivers additional content. That is, as described in detail above, the system will return the additional content associated with the target object to the display device where it will be displayed to the user, or send an email to the user, or otherwise deliver the additional content to the user. This may be accomplished using any of the variously described methods throughout the present disclosure. For example, the system may display an advertisement on the display screen associated with the recognized object, or the system may return a personalized message on the display screen and/or a second display screen, or the system may return additional content based on the number of recognized objects associated with an entity in the user's room compared to, e.g., the number of recognized objects in other's rooms within the user's neighborhood. In some embodiments, the system use physical proximity of devices to determine the best route for delivering the additional content. For example, the system may determine that the user has a second screen device 1422 in the room with the display, and rather than overlaying the additional content on the main display, the system can choose to send the additional content to the second screen device 1422 instead. Other homes lacking the second screen device 1422 might still have the additional content appear on their primary displays. In other embodiments, the system may graphically overlay additional content on a generic or other product placement, and/or scramble other objects located in the content. For example, in order to offer an advertiser exclusivity, a system may scramble or otherwise remove any other brands or logos appearing in the content that is not complimentary to the additional content. Or the system may graphically overlay additional content on generic products placed within the delivered content. Any of the aforementioned methods of returning additional content, as described in detail above, may be used at step 1734.

At step 1736, a user's profile may be updated. For example, information regarding what objects were matched and/or what additional content was delivered may be stored in a user's profile. Accordingly, a system may reference such information when returning additional content in the future. For example, an entity who has associated content with a target object on the target list may specify, e.g., a limit to how many times additional content may be returned in a given time period. Thus, when returning additional content in the future, the system may first determine whether or not a maximum amount of times has been reached. Further, as discussed in relation to the, e.g., loyalty programs above, loyalty points may be added and/or promotional offers returned to a user's profile in connection with the returned additional content. Further, information relating to objects recognized and content returned may be stored in a user's profile. In this embodiment, a user could thus periodically review objects that have been recognized and additional content that has been returned.

Once the user profile is updated at step 1736, the method proceeds to the step 1710 wherein the system determines whether or not it should continue to capture images. If yes, the method proceeds through each step as indicated above. If no, the method ends.

Although example embodiments are described above, the various features and steps may be combined, divided, omitted, and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. An apparatus comprising:
one or more processors; and
memory storing instructions that, when executed by the one or more processors, cause the apparatus to:
use a camera to capture a plurality of images during output of media content, wherein the plurality of images comprise images of a user and an environment in which the media content is being output;
cause computerized image processing of the plurality of images to determine that an object has been removed from the environment;
select, based on the determining that the object has been removed from the environment and based on a target list associating the object with additional content, the additional content to be output for the user; and
cause output of the selected additional content.

2. The apparatus of claim 1, wherein the instructions, when executed by the one or more processors, cause the apparatus to select the additional content by:
executing eye tracking to determine eye focus of the user in the plurality of images;
determining that the eye focus has changed, in the plurality of images, between two portions of a display via which the media content was output;
accessing information indicating different selectable items corresponding to different portions of the display; and
selecting, based on the information and the change in eye focus, the additional content.

3. The apparatus of claim 1, wherein the instructions, when executed by the one or more processors, further cause the apparatus to select the additional content by:
executing eye tracking to determine eye focus of the user in the plurality of images; and
selecting, based on the eye focus, the additional content.

4. The apparatus of claim 1, wherein the media content comprises a plurality of video programs.

5. The apparatus of claim 1, wherein the instructions, when executed by the one or more processors, further cause the apparatus to:
track eye focus of the user during output of the media content via a display; and
cause output of different additional content based on the eye focus targeting different objects in the media content.

6. The apparatus of claim 1, wherein the instructions, when executed by the one or more processors, further cause the apparatus to select the additional content based on determining that an eye focus of the user has remained constant for a minimum duration of time.

7. The apparatus of claim 1, wherein the target list indicates:
a first identifier visible on the object; and
that the associated additional content is to be output if the first identifier is replaced with a second object, having a second identifier, in the environment.

8. A system comprising:
a computing device and a camera;
wherein the computing device comprises:
one or more first processors; and
memory storing first instructions that, when executed by the one or more first processors, cause the computing device to:
receive, from the camera, a plurality of images during output of media content, wherein the plurality of images comprise images of a user and an environment in which the media content is being output;
cause computerized image processing of the plurality of images to determine that an object has been removed from the environment;
select, based on the determining that the object has been removed from the environment and based on a target list associating the object with additional content, the additional content to be output for the user; and
cause output of the selected additional content, and
wherein the camera comprises:
one or more second processors; and
memory storing second instructions that, when executed by the one or more second processors, cause the camera to:
capture the plurality of images
send, to the computing device, the plurality of images.

9. The system of claim 8, wherein the first instructions, when executed by the one or more first processors, cause the computing device to select the additional content by:
executing eye tracking to determine eye focus of the user in the plurality of images;
determining that the eye focus has changed, in the plurality of images, between two portions of a display via which the media content was output;
accessing information indicating different selectable items corresponding to different portions of the display; and
selecting, based on the information and the change in eye focus, the additional content.

10. The system of claim 8, wherein the first instructions, when executed by the one or more first processors, cause the computing device to select the additional content by:
executing eye tracking to determine eye focus of the user in the plurality of images; and
selecting, based on the eye focus, the additional content.

11. The system of claim 8, wherein the media content comprises a plurality of video programs.

12. The system of claim 8, wherein the first instructions, when executed by the one or more first processors, cause the computing device to:
track eye focus of the user during output of the media content via a display; and
cause output of different additional content based on the eye focus targeting different objects in the media content.

13. The system of claim 8, wherein the first instructions, when executed by the one or more first processors, cause the computing device to select the additional content based on determining that an eye focus of the user has remained constant for a minimum duration of time.

14. The system of claim 8, wherein the target list indicates:
a first identifier visible on the object; and
that the associated additional content is to be output if the first identifier is replaced with a second object, having a second identifier, in the environment.

15. A non-transitory computer-readable medium storing instructions that, when executed, cause:
using a camera to capture a plurality of images during output of media content, wherein the plurality of images comprise images of a user and an environment in which the media content is being output;
causing computerized image processing of the plurality of images to determine that an object has been removed from the environment;
selecting, based on the determining that the object has been removed from the environment and based on a target list associating the object with additional content, the additional content to be output for the user; and
causing output of the selected additional content.

16. The non-transitory computer-readable medium of claim 15, wherein the instructions, when executed, cause the selecting of the additional content by:
executing eye tracking to determine eye focus of the user in the plurality of images;
determining that the eye focus has changed, in the plurality of images, between two portions of a display via which the media content was output;
accessing information indicating different selectable items corresponding to different portions of the display; and
selecting, based on the information and the change in eye focus, the additional content.

17. The non-transitory computer-readable medium of claim 15, wherein the instructions, when executed, cause the selecting of the additional content by:
executing eye tracking to determine eye focus of the user in the plurality of images; and
selecting, based on the eye focus, the additional content.

18. The non-transitory computer-readable medium of claim 15, wherein the media content comprises a plurality of video programs.

19. The non-transitory computer-readable medium of claim 15, wherein the instructions, when executed, further cause:
tracking eye focus of the user during output of the media content via a display; and
causing output of different additional content based on the eye focus targeting different objects in the media content.

20. The non-transitory computer-readable medium of claim 15, wherein the instructions, when executed, cause the selecting of the additional content based on determining that an eye focus of the user has remained constant for a minimum duration of time.

21. The non-transitory computer-readable medium of claim 15, wherein the target list indicates:
a first identifier visible on the object; and
that the associated additional content is to be output if the first identifier is replaced with a second object, having a second identifier, in the environment.

* * * * *